(12) United States Patent
Pitchai-Mydeen et al.

(10) Patent No.: US 9,620,779 B2
(45) Date of Patent: Apr. 11, 2017

(54) METHOD OF PRODUCING ELECTRICALLY CONDUCTIVE POLYMER AND CELLULOSE NANOCOMPOSITES

(71) Applicant: The Governing Council of the University of Toronto, Toronto (CA)

(72) Inventors: Syed Abthagir Pitchai-Mydeen, Toronto (CA); Ning Yan, Toronto (CA)

(73) Assignee: THE GOVERNING COUNCIL OF THE UNIVERSITY OF TORONTO, Toronto, ON (CA)

( * ) Notice: Subject to any disclaimer, the term of this patent is extended or adjusted under 35 U.S.C. 154(b) by 0 days.

(21) Appl. No.: 14/848,580

(22) Filed: Sep. 9, 2015

(65) Prior Publication Data

US 2016/0072131 A1    Mar. 10, 2016

Related U.S. Application Data

(62) Division of application No. 13/697,698, filed as application No. PCT/CA2011/050294 on May 12, 2011, now abandoned.
(Continued)

(51) Int. Cl.
*H01B 1/12* (2006.01)
*H01M 4/60* (2006.01)
(Continued)

(52) U.S. Cl.
CPC ............ *H01M 4/608* (2013.01); *C08J 5/18* (2013.01); *C08L 1/04* (2013.01); *C08L 101/10* (2013.01); *C09D 5/24* (2013.01); *C09D 7/125* (2013.01); *C09D 7/1266* (2013.01); *C09D 7/1291* (2013.01); *C09D 179/04* (2013.01); *H01B 1/127* (2013.01); *H01M 4/366* (2013.01); *H01M 4/60* (2013.01); *H01M 4/62* (2013.01); *H01M 4/621* (2013.01); *H01M 4/622* (2013.01); *H01M 4/624* (2013.01); *C08J 2300/12* (2013.01); *C08K 7/02* (2013.01); *C08K 9/04* (2013.01); *C08K 9/10* (2013.01); *H01M 10/0525* (2013.01); *H01M 2220/20* (2013.01)

(58) Field of Classification Search
None
See application file for complete search history.

(56) References Cited

PUBLICATIONS

Flandin et al, "New Nanocomposite Materials Made of an Insulating Matrix and Conducting Fillers: Processing and Properties," Polymer Composites, Apr. 2000, Vo. 21, No. 2, pp. 165-174.*

* cited by examiner

*Primary Examiner* — Colin W Slifka
(74) *Attorney, Agent, or Firm* — Lynn C. Schumacher; Stephen W. Leonard; Hill & Schumacher

(57) ABSTRACT

A method is provided for preparing electrically conductive polymer and cellulose nanocomposite particles and nanocomposite materials. Cellulose microparticles coated with a conductive polymer are added to an acid solution for initiating an acid hydrolysis reaction for a prescribed time interval to form conductive polymer coated cellulose nanoparticles. After quenching the acid hydrolysis reaction, the nanoparticles are separated to obtain a colloidal solution of conductive nanoparticles. The conductive nanoparticles may be subsequently formed into a solid nanocomposite material such as a conductive film. Transparent conductive films may be prepared by forming thin layers having a thickness on a micron or submicron scale.

22 Claims, 17 Drawing Sheets

Related U.S. Application Data

(60) Provisional application No. 61/333,953, filed on May 12, 2010.

(51) Int. Cl.
*H01M 4/62* (2006.01)
*C08J 5/18* (2006.01)
*C08L 1/04* (2006.01)
*C08L 101/10* (2006.01)
*C09D 5/24* (2006.01)
*C09D 7/12* (2006.01)
*C09D 179/04* (2006.01)
*H01M 4/36* (2006.01)
C08K 7/02 (2006.01)
C08K 9/04 (2006.01)
C08K 9/10 (2006.01)
H01M 10/0525 (2010.01)

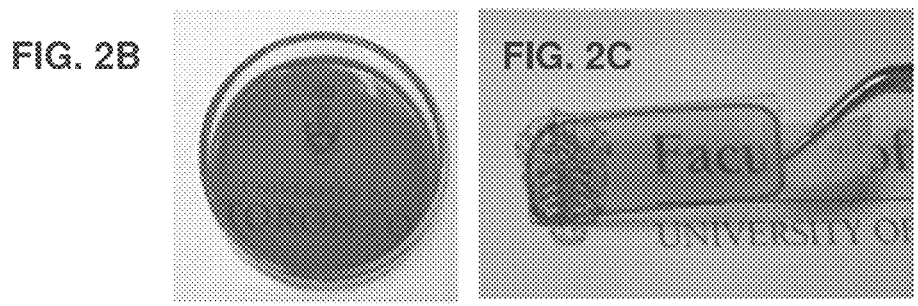
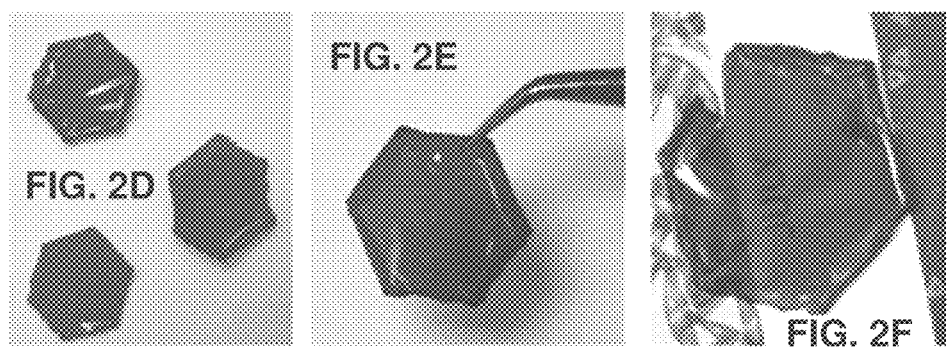
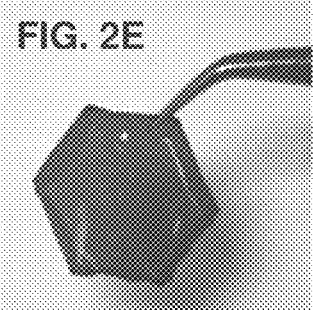
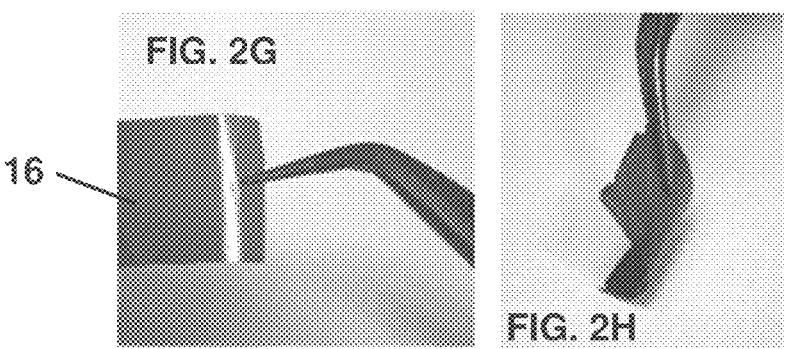
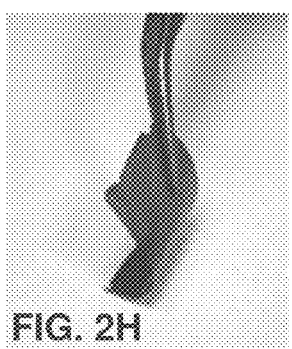

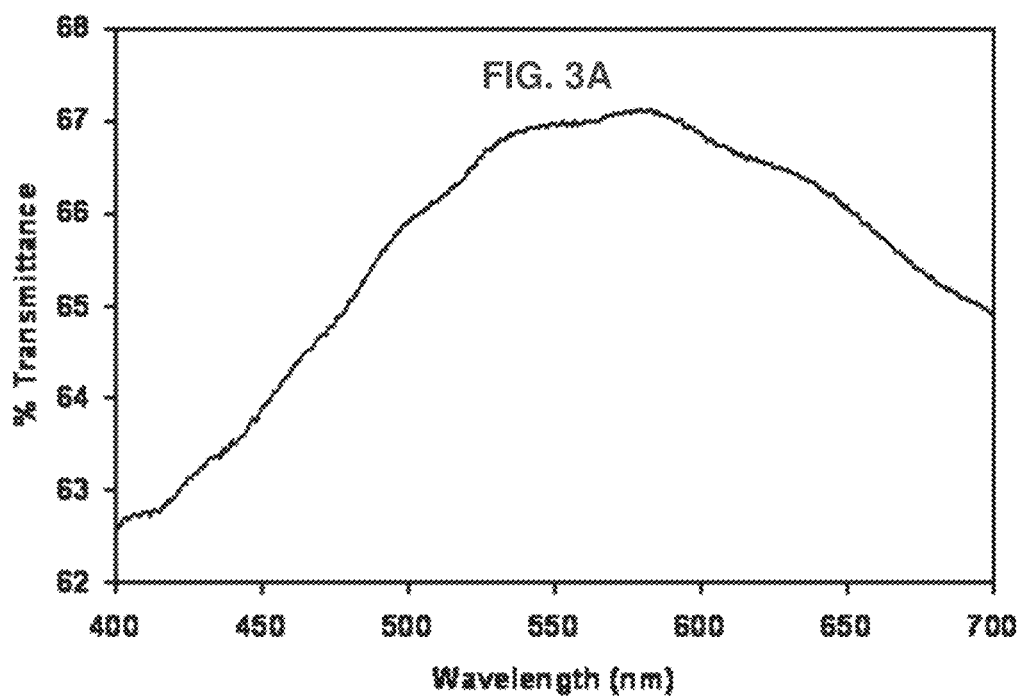
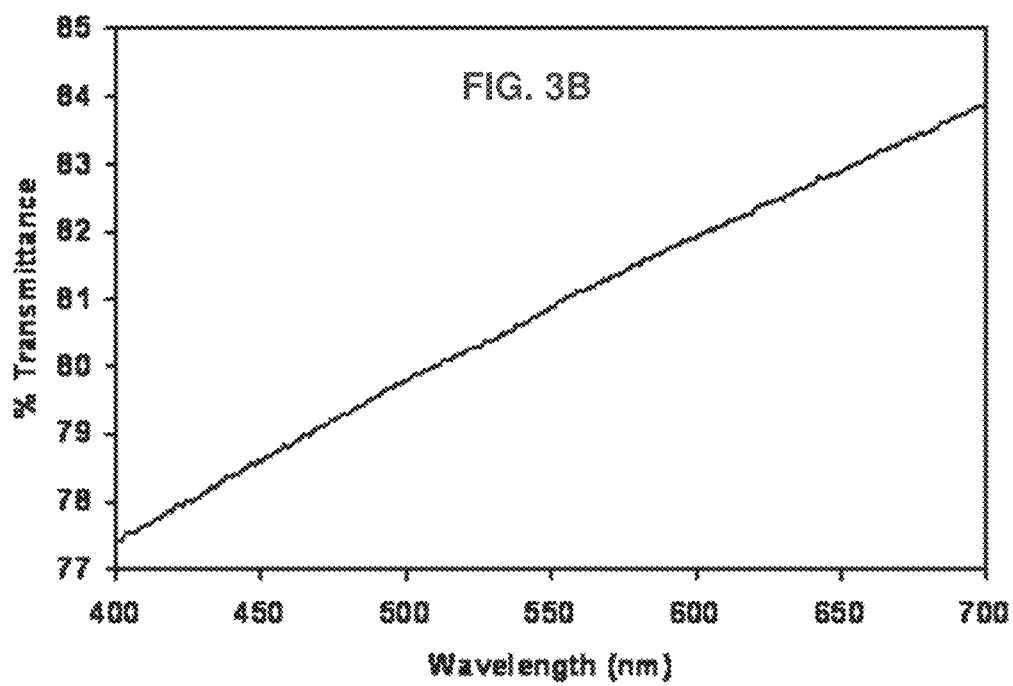

FIG. 4A
20 μm
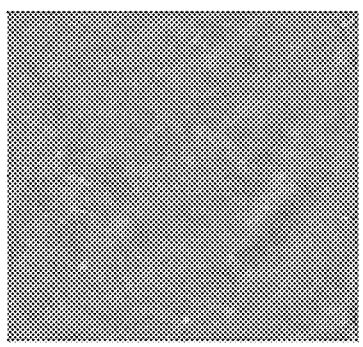 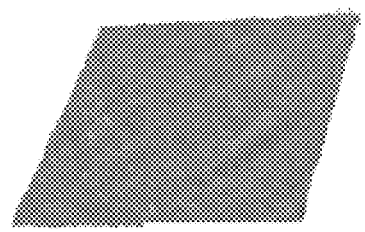
FIG. 4B
5 μm
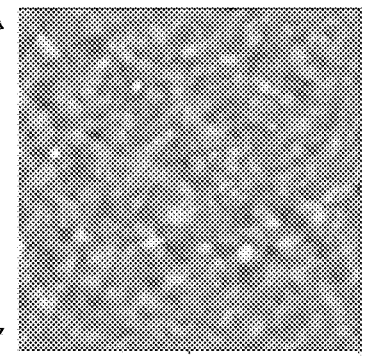 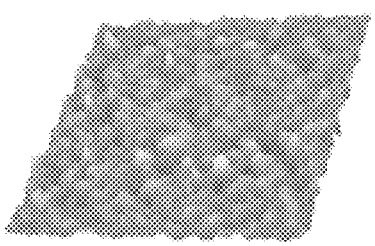
FIG. 4C
2.47 μm
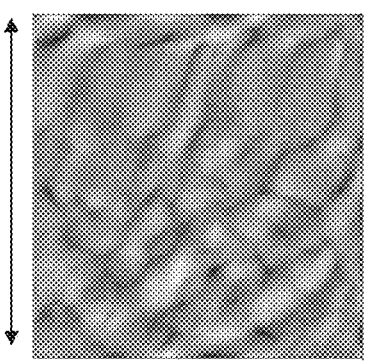 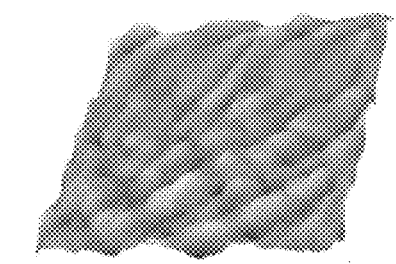

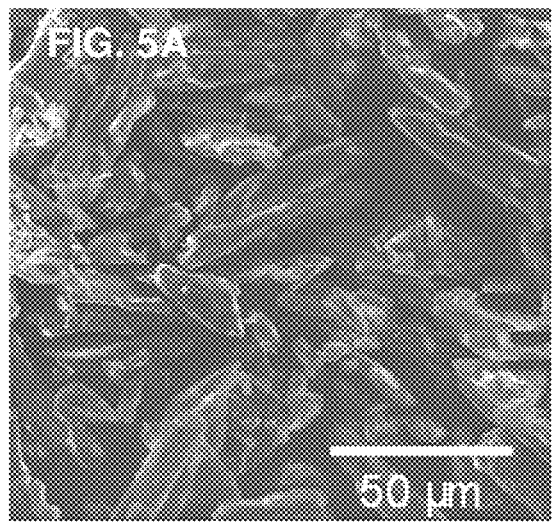
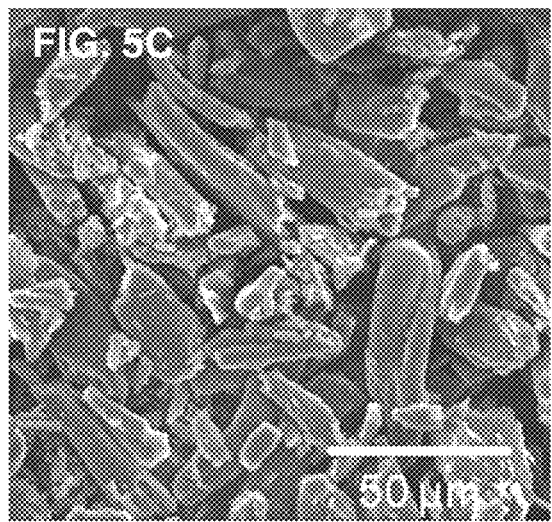
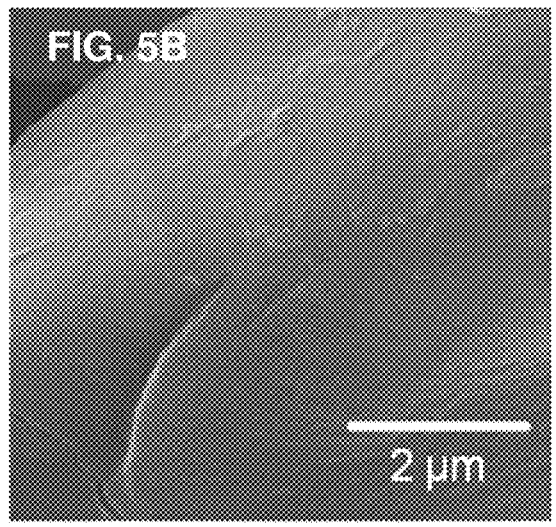
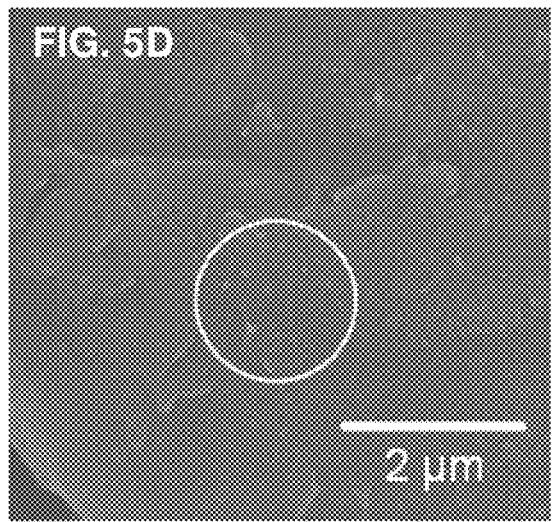

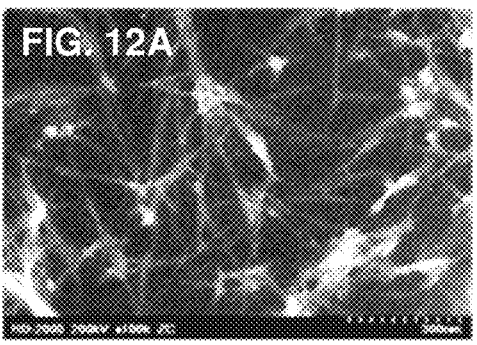
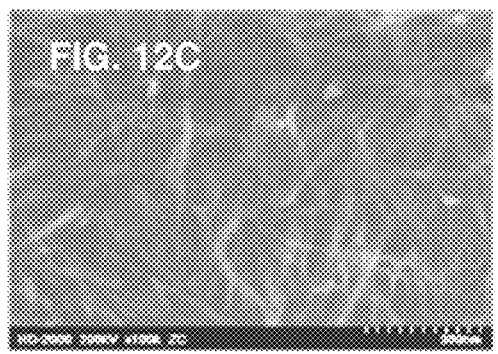
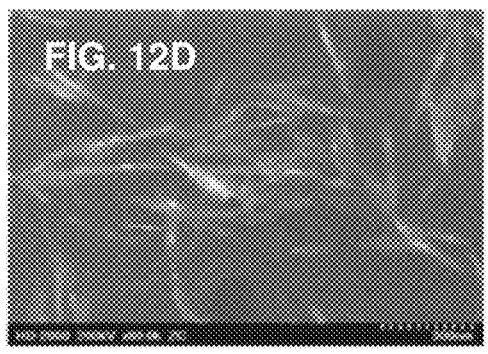

METHOD OF PRODUCING ELECTRICALLY CONDUCTIVE POLYMER AND CELLULOSE NANOCOMPOSITES

CROSS-REFERENCE TO RELATED APPLICATION

This application claims priority to U.S. Provisional Application No. 61/333,953, titled "METHOD OF PRODUCING ELECTRICALLY CONDUCTIVE POLYMER AND CELLULOSE NANOCOMPOSITES" and filed on May 12, 2010, the entire contents of which are incorporated herein by reference.

BACKGROUND

The present disclosure relates to polymer-cellulose composites, and more particularly, the present disclosure relates to conductive polymer-cellulose nanocomposites.

Cellulose is one of the most abundant renewable biomaterials on earth. It is a linear condensation polymer of glucose units joined together by β-1,4-glycosidic bonds. Though commonly found as fibrous materials with both amorphous and crystalline regions in nature, highly crystalline nanocellulose material of both needle and spherical shapes can be prepared through acid hydrolysis methods [1-4].

Meanwhile, organic conductive polymers have been widely investigated since their introduction in the 1970's due to their good environmental stability and desirable electrical, chemical and optical properties [5, 6]. Among various types of conductive polymers, polypyrrole (PPy) and polyaniline received most attention. PPy has been shown to have promising applications in many areas, such as to be used as electrode materials in rechargeable lithium batteries, substrates for sensors, and antistatic coatings and packaging, and etc. [7-9].

More recently, efforts were made to produce more environmentally friendly conductive polymer composites and films by combining renewable cellulosic materials with a conductive polymer. With the conductive polymer encapsulating the cellulosic component, the novel hybrid materials showed combined characteristics of both components [10-15]. However, the cellulose materials still retained their original physical attributes (dimensions) and chemical properties. Meanwhile, it is well known that nano-cellulose materials are typically very difficult to re-disperse in high concentrations in water or solvents and have poor drainage properties. At low moisture concentrations, nano-cellulose materials become gels and water cannot be easily removed. In addition, cellulose-polypyrrole composites reported in the literature appear to be black and opaque solids (film or paper) that limit their potential applications. Some had poor flexibility and high brittleness [16].

SUMMARY

In a first embodiment, a method of preparing conductive nanoparticles comprising cellulose and conductive polymer is provided, the method comprising the steps of providing microparticles comprising cellulose coated with a conductive polymer; adding the microparticles to an acid solution for initiating an acid hydrolysis reaction; reacting the microparticles with the acid for a prescribed time interval to form conductive polymer coated cellulose nanoparticles; and quenching the acid hydrolysis reaction.

Prior to initiating the acid hydrolysis reaction, the microparticles may be washed with a reagent that may be one of ethanol, methanol, and HCl; and may be subsequently washed with a solution comprising a dopant. The dopant may be one of chloride and sulphate, and in the case where the dopant is chloride, the solution comprising a dopant may be hydrochloric acid. In one embodiment, the hydrolysis reaction may be maintained at a temperature above room temperature, for example, between about 40° C. and 80° C.

In a further embodiment, the conductive polymer may be one of polypyrrole, polyaniline, polyindole, polythiophene, poly(3-methylthiophene), poly(N-methyl aniline), and poly(o-toluidine). The acid solution may be a strong acid, such as sulphuric acid, hydrochloric acid, and formic acid. In one embodiment, the cellulose microparticles comprise microcrystalline cellulose.

The time interval may be chosen such that an average diameter of the nanoparticles is between about 30 and 50 nanometers, and an average length of the nanoparticles is between about 300 and 500 nanometers. The step of quenching the acid hydrolysis reaction may be performed by reducing a temperature of the acid solution, or by reducing a temperature of the acid solution, or by adding water with a temperature lower than a temperature of the acid solution.

In a further embodiment, the microparticles comprising cellulose coated with a conductive polymer may be provided by the following steps: forming a mixture comprising cellulose microparticles, a monomer and a surfactant; agitating the mixture to disperse the microparticles and to obtain cellulose microparticles coated with the monomer; initiating a polymerization reaction to obtain cellulose microparticles coated with a conductive polymer; and allowing the reaction to proceed for a prescribed time interval. The step of initiating a polymerization reaction may comprise adding an oxidant to the mixture, thereby initiating a polymerization reaction to form cellulose microparticles coated with the conductive polymer.

The microparticles may have a number of possible structures. In one embodiment, the microparticles have a mean diameter between about 20 micrometers and about 25 micrometers and a length between about 40 and 60 micrometers. In another embodiment, the microparticles comprise rod-like fibers and fibrils comprising mostly crystalline structures, the fibers and fibrils having a mean diameter between about 20 and about 25 micrometers, and a mean length between about 0.1 and 10 millimeters. In another embodiment, the microparticles contain rod-like fibers and fibrils comprising crystalline structures and amorphous structures, the crystalline structures having a mean diameter between about 20 and 25 micrometers.

In one embodiment, the oxidant may be one of iron (III) chloride hexahydrate, ferric chloride, ammonium persulphate, potassium persulphate, phosphomolybdic acid hydrate, phosphate, bromide, perchloroate, and p-toluene sulphonate; and the surfactant may be one of: sulfonic naphthalene acid, anthrquinone-2-sulfonic acid, tween-80, naphtalene sulfonic acid, p-dodecylbenzenesulfonic acid, cetyl trimethylammonium bromide, sodium dodecyl sulphate, cetyltrimethylammonium bromide and tritonX-100, alkyl sulfonates, and alkyl aryl sulfonate.

In yet another embodiment, prior to the step of adding initiating the polymerization reaction, the following steps may be performed: separating the cellulose microparticles coated with the monomer from the mixture; and rising the cellulose microparticles coated with the monomer in a solution of the monomer.

In another embodiment, the nanoparticles may be separated from the acid solution to obtain a colloidal solution of the nanoparticles. This separation may be performed using one of centrifugation and electrophoretic separation.

In a further embodiment, the colloidal solution of nanoparticles may be used to create a film by casting the colloidal solution. The casting may be performed by pouring the colloidal solution onto a solid surface, and drying the solution to obtain a solid conductive composite nanomaterial. The colloidal solution may be concentrated to a nanoparticle weight fraction between about 0.1 and 1% prior to casting the colloidal solution. The colloidal solution may form a conductive coating on the solid surface. Alternatively, the solid surface may comprise a mold. In one embodiment, the conductive coating has a thickness on one of a micron scale and a sub-microscale. It may chosen to be sufficiently small to allow the transmission of light through the conductive coating. The conductive coating may be cast such that a peak optical transmittance of at least 50% within the visible spectrum.

In a further embodiment, a conductive nanocomposite material may be produced from the colloidal solution. A transparent nanocomposite conductive film may be produced from the colloidal solution.

In another embodiment, there is provided a transparent nanocomposite conductive film comprising cellulose nanoparticles coated with a conductive polymer. The conductive polymer may be one of polypyrrole, polyaniline, polyindole, polythiophene, poly(3-methylthiophene), poly(N-methyl aniline), and poly(o-toluidine).

The conductive nanocomposite material comprising cellulose nanoparticles coated with a conductive polymer may be used in a number of applications, including but not limited to liquid crystal displays, electrodes, biosensors, static discharge protection materials, and packaging.

A further understanding of the functional and advantageous aspects of the disclosure can be realized by reference to the following detailed description and drawings.

BRIEF DESCRIPTION OF THE DRAWINGS

Embodiments will now be described, by way of example only, with reference to the drawings, in which:

FIGS. 2A-I shows various transparent NCC-polypyrrole (PPy) films, include (a)) a glass slide with no coating and an NCC-PPy film cast on a glass slide, (b) an NCC-PPy film cast on the surface of a petri dish, (c)-(h) various free-standing NCC-PPy films, and (i) a flexible NCC-PPy film cast on a flexible plastic substrate.

FIGS. 3A-B show UV-visible spectra of a nanocrystalline cellulose (NCC)-PPy (a) 2300 nm thick film and a (b) NCC 700 nm thick film coated on a glass slide;

FIGS. 4A-C show atomic force microscopy images of a NCC-PPy film on a glass substrate, 20×20 $\mu m^2$, 5×5 $\mu m^2$ and 2×2 $\mu m^2$ in measurement area, where (a) through (c) show increasing levels of magnification;

FIGS. 5A-D are scanning electron microscope image of MCC at (a) low and (b) high magnification; and MCC-PPy at (c) low and (d) high magnification;

FIG. 10(a) shows 5 cycles and FIG. 10(b) shows one cycle.

FIGS. 12A-D show transmission electron microscopy images of NCC-PPy colloids formed from (a) kraft pulp fibers, (b) cellulosic fibers from bark, (c) microcrystalline cellulose fibers, and (d) cellulose powder having a 20 micron size;

DETAILED DESCRIPTION

Various embodiments and aspects of the disclosure will be described with reference to details discussed below. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

As used herein, the terms, "comprises" and "comprising" are to be construed as being inclusive and open ended, and not exclusive. Specifically, when used in the specification and claims, the terms, "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately", when used in conjunction with ranges of dimensions of particles, compositions of mixtures or other physical properties or characteristics, are meant to cover slight variations that may exist in the upper and lower limits of the ranges of dimensions so as to not exclude embodiments where on average most of the dimensions are satisfied but where statistically dimensions may exist outside this region. It is not the intention to exclude embodiments such as these from the present disclosure.

As used herein, the term "conductive polymer" refers to an organic polymer that conducts electricity.

As used herein, the term "strong acid" refers to an acid that ionizes substantially in an aqueous solution by losing one proton. More precisely, it refers to acids with a disassociation constant pKa less than approximately −1.74.

In a first embodiment, a method is provided for preparing electrically conductive nanocomposite materials from microcrystalline cellulose and a conductive polymer. A colloid of polymer encapsulated nanocrystalline cellulose is obtained by acid hydrolysis of polymer coated microcrystalline cellulose (MCC) particles. Usage of the polymer coated microcrystalline cellulose particles solves the dispersion and drainage problems associated with the nanocrystalline cellulose material. The resulting colloid from the acid hydrolysis is well dispersed and suitable for casting on surfaces to create optically transparent films.

Figure 1:
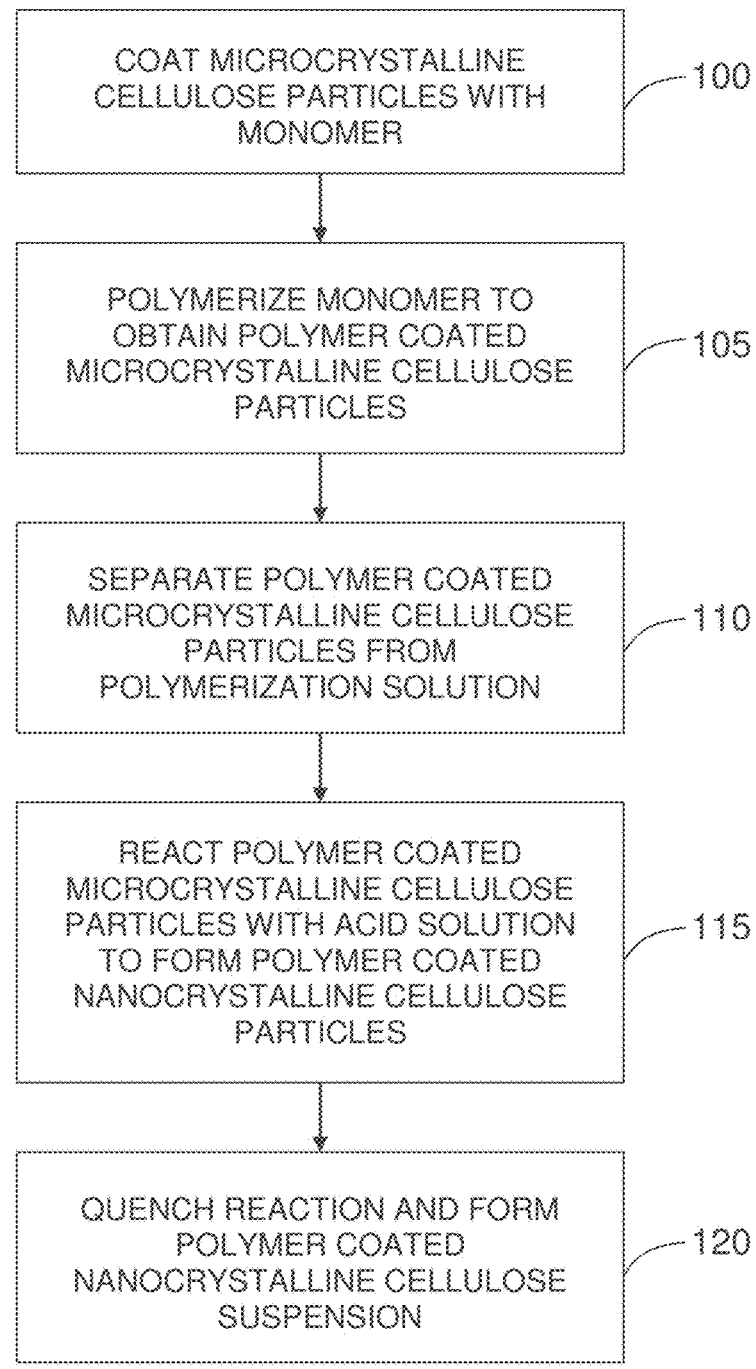
FIG. 1 provides a flow chart illustrating a method of forming a conductive polymer coated nanocrystalline cellulose (NCC) nanomaterial.
Figure 21:

Referring to FIG. 1, a flow chart is provided that illustrates an example method of forming the conductive polymer-cellulose nanocomposite material. In step 100, cellulosic microparticles are coated with a monomer. This step may be achieved by dispersing the cellulosic microparticles with the monomer in the presence of a surfactant, such as p-dodecylbenzenesulfonic acid. The suspension is agitated, for example, by stirring, over a time interval sufficient for coating the cellulosic microparticles with the monomer. A suitable but non-limiting time interval is approximately 2 hours.

The cellulosic microparticles have at least one dimension on the micron scale, and may be microparticles with a mean diameter between approximately 20 μm and 25 μm and a mean length between approximately 40 μm to 60 μm. Alternatively, the cellulosic microparticles may include rod-like fibers or fibrils containing mostly crystalline structure (i.e. the microparticles may be microcrystalline cellulose particles) or containing both crystalline and amorphous structures (i.e. the particles may be plant, algae, bacteria or wood cellulose fibers after delignification) having a mean diameter on the micron scale and a length varying from a micron to centimetre scale depending on species. In one embodiment, the cellulosic microparticles are microcrystalline cellulose (MCC) particles. As shown in the examples below, suitable cellulose materials for forming NCC-PPy coatings, films, colloids and other compositions include kraft pulp fibers, cellulosic fibers from bark, and microcrystalline and other cellulose powers having microscale dimensions.

According to one example method, the monomer coated cellulosic microparticles are washed one or more times. The resulting washed and coated microparticles may optionally be rinsed again in a solution of the monomer (for example, employing a solution of the monomer having the same concentration as the monomer solution used in the first coating step) to compensate for the loss of the monomer during the prior washing steps.

The monomer-coated microparticles are then polymerized using an oxidant in step 105, thereby forming conductive polymer coated cellulosic microparticles. The polymerization step may be achieved using of many methods known in the art, including, but not-limited to ionic oxidation, electrochemical oxidation, and ultrasonic oxidation. The polymerization step may also be obtained by using other non oxidation methods, including, but not limited to heating. The polymerization step may be achieved by adding a polymerization-inducing oxidant to the monomer-coated cellulosic microparticles. A suitable oxidant is ferric chloride. In one example implementation, the particles are constantly agitated, for example, by constant stirring, and the polymerization reaction is allowed to progress for sufficient time interval to coat the microparticles, such as approximately 3 hours. The length of the time interval may be adjusted to achieve a desired amount of polymer coverage.

In step 110, the polymer coated cellulosic microparticles are separated from the polymerization reagents and reactants, and are washed to remove excess oligomers and non-reacted chemicals. The washed polymer coated cellulosic microparticles may be contacted with a solution that provides a dopant for increasing the conductivity of the polymer. An example dopant is chloride, and a corresponding example doping solution is HCl.

The polymer-coated cellulosic microparticles are then either dried to form a powder, or a colloidal solution is formed by adding water.

In step 115, the polymer coated cellulosic microparticles are reacted with an acid to form polymer coated cellulosic nanoparticles in an acid hydrolysis step. Example acids include sulphuric acid, hydrochloric acid (for example, 4 molar), formic acid, and maleic acid. The acid may include sulphuric acid, for example, with a concentration in the range of 55% to 75%. In one example implementation, the reaction may be carried out at 40° C. to 65° C., and for a time duration of approximately 30 to 60 minutes. The acid hydrolysis step is performed for a time interval sufficient to obtain polymer coated nanocrystalline particles of a desired size. An example size is an average diameter (D) of 40±10 nm and length (L) of 400±100 nm range.

The reaction may be conducted above room temperature to accelerate the cellulosic nanoparticles forming process. For example, when sulphuric acid is employed for the acid hydrolysis step, the temperature may be maintained at approximately 45 degrees, and the reaction may be allowed to proceed for approximately 45 minutes under constant stirring. In another embodiment, the cellulosic nanoparticles are nanocrystalline cellulose (NCC) particles.

The reaction is subsequently quenched in step 120, for example, by diluting the acid suspension in a large cold water bath. A separation step may then be performed to obtain a colloidal suspension of the polymer coated nanoparticles. In non-limiting examples, separation may be achieved using a high-speed centrifuge or an electrophoretic separation step. After the separation step, the polymer coated cellulosic nanoparticles may be washed to obtain a substantially purified nanocomposite colloidal solution.

The nanocomposite colloidal solution may be subsequently cast and dried to obtain a solid conductive nanocomposite material. A solid conductive nanocomposite material may be obtained by pouring a concentrated nanocomposite colloidal solution (concentrated through a separation step as described above) into a cast, drying the colloidal solution to form a solid, and removing the resulting solid conductive nanocomposite material from the cast. The resulting nanocomposite material provides a flexible and electrically conducting nanocomposite material that can adapted to a wide range of applications, as further described below. Alternatively, a solid conductive nanocomposite coating may be applied to a surface by applying a concentrated nanocomposite colloidal solution to a surface and drying the colloidal solution to form a coating layer.

In an example embodiment, the coating layer has a micron or submicron thickness, resulting in an optically transmissive electrically conducting nanocomposite coating. An example colloidal solution for forming the film may have a nanocomposite concentration of approximately 0.5% by weight. The coating may be formed to have a thickness ranging from 2 to 3 microns. In one example, a coating may be formed by dropping a colloidal solution (for example, with a concentration of ∼0.06 to 0.09 g/cm$^2$) on a glass slide.

Various optically transmissive NCC-PPy films, both coated onto a substrate and in a free-standing form, are shown in FIGS. 2A-I. An example conducting polymer for forming the composition is polypyrrole (PPy). A colloid of PPy encapsulated NCC (NCC-PPy) may be obtained by acid hydrolysis of PPy coated MCC (MCC-PPy) particles in sulphuric acid. As shown in the examples below, the conversion of the MCC-PPy to NCC-PPy shows both retention of the polypyrrole (and thus its conductive and redox characteristics and chemical and thermal stability) on the NCC surface and maintains of some unique optical and mechanical properties associated with the NCC materials (i.e. optical transparency and mechanical properties such as flexibility).

As further described below, the preceding method can be employed to provide a highly stable PPy-NCC colloid in water and used to make conductive films, coatings, and composites. The PPy-NCC particles obtained in the examples below had a needle shape and were in the nano size range with a high degree of crystallinity. The conductivity of the stand-alone films and coatings made from the NCC-PPy colloids were in the range of $10^{-2}$ S/cm, approaching the value for PPy pellets. The conductive thin films and coatings were also optically transmissive (with peak transmittance >67% at wavelength of 566 nm) in the visible light wavelength range. In addition, the NCC-PPy thin films were flexible with good mechanical properties and could be bent without sustaining damage. The NCC-PPy films were thermally stable up to 200° C. and had a high weight retention at the higher temperatures (>40% at >500° C.)

Moreover, the NCC-PPy films made using this technique were insoluble in water and in a range of organic solvents, including ethanol, methanol, chloroform, and acetone. The films were highly stable in buffering solutions of pH ranged from 1-11 and showed some degrees of stability in weak acids. The measurement of cyclic voltammograms of the NCC-PPy coated electrode exhibited a high level of redox electro-activity suggesting the NCC-PPy to be suitable electrode materials in solid state battery applications.

As noted above, the above method avoids problems with obtaining stable and dispersed polymer coated nanocrystalline cellulose by performing the polymerization coating step prior to the step of forming nanoparticles. The method thus provides a convenient and simple method for the pre-polymerization of micron-sized particles, which form stable dispersed colloidal solutions.

It is to be understood that the above method is merely exemplary and that the materials, parameters and process steps can be varied without departing from the scope of the present disclosure. In other non-limiting embodiments, the organic conductive polymer may be polyaniline, polyindole, polythiophene, poly(3-methylthiophene), poly(N-methyl aniline), poly(o-toluidine). The surfactant used to form a dispersion of the MCC may be selected from the group consisting of sulfonic naphthalene acid, anthrquinone-2-sulfonic acid, tween-80, naphtalene sulfonic acid, p-dodecylbenzenesulfonic acid, cetyl trimethylammonium bromide, sodium dodecyl sulphate, cetyltrimethylammonium bromide and tritonX-100, and others such as alkyl sulfonates and alkyl aryl sulfonates. Example oxidants include ammonium persulphate, potassium persulphate, phosphomolybdic acid hydrate. Example acids for performing the acid hydrolysis include sulphuric acid, hydrochloric acid, and formic acid. Example reagents for washing the PPy-MCC product may include ethanol, methanol, and HCl.

Conducting nanocomposite films according to aforementioned embodiments are suitable for a wide range of applications, including, but not limited to, battery electrodes, biosensor substrates and electrodes, conductive coatings for anti-static and static discharge protection applications, shielding, transparent electrodes and coatings for use with displays, and conductive coatings for packaging. Furthermore, these composites provide environmentally friendly alternative materials to fossil fuel based conductive polymer products.

In one embodiment, conductive nanocomposite films as described above may be used as optically transmissive conductors, which may be employed, for example, in display applications. In a non-limiting example, a film may provide a conductive and optically transmissive electrode in a liquid crystal display. In another non-limiting example, PPy-NCC film can be deposited or coated on plastic substrate, such as a substrate used for making reflective plastic liquid crystal displays. A PPy-NCC film can be flexed and bent with the plastic substrate without damage, as shown in FIG. 2(i). Optical transmission and electrical conductance make the PPy-NCC film a suitable choice for LCD applications, among other applications.

The films may be used as electrodes in batteries, optionally with a flexible morphology. An example battery may include at least one electrode formed from a NCC-PPy material, which may be provided in the form of a film. The film may be flexible. A battery cell may be assembled with the oxidized (i.e. doped) and reduced (i.e. undoped) films of the PPY-NCC composite as electrodes separated by an electrolyte soaked sheet. Two pieces of current collector (for example, platinum) may be attached on the electrodes (conductive polymers) to directly charge the battery or measure voltage. For prolonged application, the battery cell may be kept in the inert atmosphere i.e. sealed pouch/container to avoid evaporation of electrolyte. PPy-NCC colloid can also be used to coat one active electrode in a battery, such as a lithium ion secondary battery application with a propylene carbonate (PC) solutions of tetraethyl ammonium perchlorate (TEAP) as the electrolyte.

Because the films are conducting with good mechanical properties, they may be used to fabricate conductive biodegradable packaging for electronic parts and the like. PPy-NCC films and coatings can be used as antistatic and electrostatic dissipative (ESD) flexible packaging materials for electrical and electronics that can protect the enclosed content from damage by static discharge. In some cases, such films or coatings can be used to reduce dust accumulation and contamination. Furthermore, by providing films or coatings that are optically transmissive, films or coatings may be provided that exhibit electrical conductivity while allowing the internal contents of the packaging may to be visible. In yet another embodiment, conductive nanocomposite films as described above provide electrode materials for use in biosensors. The film may be functionalized to enable the binding of various biomolecules, including, biological recognition and/or signal generating moieties including, but not limited to, nucleic acid probes, antibodies, enzymes. In one embodiment, the film may be functionalized to permit the covalent attachment of antibodies for use in an electrochemical biosensor. In another embodiment, the transparency of the film may be employed to optically detect an optical reporter (such as a chromophore, fluorophore, or luminescent species) employed during an assay. While Example 10 below illustrates the application of NCC-PPy to electrochemical glucose sensing, the NCC-PPy materials described herein may be applied to a wide variety of different biosensor platforms and analytes.

Other biosensing platforms include, but are not limited to, $H_2O_2$ detection and other suitable chemical, vapour/gas, biochemical detection platforms based on conductive polymers, such as polypyrrole. For example, a detection system employing a conductive nanocomposite electrode according to the aforementioned embodiments may involve hydrogen peroxide detection via peroxidase, histamines detection with MADH enzyme, chemical detection such as methanol, $NH_3$, $H_2$, CO, and humidity/water detection via a detected change in conductivity. Generally, a detection system based on electroactive polymers should be readily adapted using NCC-PPy as a sensing electrode.

The following examples are presented to enable those skilled in the art to understand and to practice embodiments of the present disclosure. They should not be considered as a limitation on the scope of the present embodiments, but merely as being illustrative and representative thereof.

EXAMPLES

Example 1

Preparation of PPy-NCC Nanoparticles

A 9 g sample of micron size (~20 micron, Aldrich product) microcrystalline cellulose powder was dispersed in 500 ml water for 5 min and the dispersion was collected on a sintered glass crucible (medium). The washed cellulose sample was dispersed again in water (~285.039 ml) with normal stirring.

About ~4.897 ml (0.05 M) of p-dodecylbenzenesulfonic acid (surfactant—Aldrich product) and ~10.064 ml (0.5 M) pyrrole (monomer—Aldrich product) was added into the cellulose sample beaker, bringing the total volume to ~300 ml. The mixture of dispersion under normal stirring for 2 hours was allowed to completely cover and soak in the monomer.

The collected monomer treated cellulose in a sintered glass crucible (medium) was thoroughly washed in water then rinsed with same concentration of monomer pyrrole (0.5 M). At this point, the dispersion was monomer-treated microcellulose.

Then 40.545 g (0.5 M) of FeCl3 (oxidant) was dissolved in 300 ml of distilled water and was added to the monomer treated cellulose to induce the polymerization. This produced a polypyrrole microcrystalline cellulose (PPy-MCC) dispersion.

The reaction was allowed to continue for 3 hours, after which the product was washed thoroughly in distilled water until solution became clear then thoroughly washed in ethanol to remove the excess of oligomers and non-reacted chemicals. The PPy-MCC product was thoroughly washed with 0.1 M HCl to maintain the Cl dopant. The washing is performed in a sintered glass crucible. All of the steps above were performed at room temperature.

The PPy-MCC product was either dried at 70° C. overnight to obtain a power, or maintained as wet PPy-MCC particles after filtration of the colloidal solution for subsequent processing.

An acid solution comprising 64% sulphuric acid ($H_2SO_4$) and 36% water (by weight) was added to a beaker and maintained at 45° C. with normal stirring in a water bath. The wet sample of PPy-MCC was added into the acid solution. After a 45 minute acid hydrolysis reaction, the PPy-MCC was transferred into 10 fold of cold water to quench the acid reaction.

A high speed centrifuge (9500 rpm) was used for separating the acid solution and non-reacted PPy-cellulose materials. The result was thoroughly washed with plenty of water and centrifuged (19000 rpm) to separate the PPy-NCC. Water was added to the PPy-NCC to produce a dispersed colloidal solution.

A film was prepared by casting the NCC-PPy colloid on various substrates at room temperature, leaving a free-standing thin NCC-PPy layer. For preparation of an experimental control (NCC without PPy), a dilute NCC colloid was dialyzed to bring its pH to neutral.

The conducting MCC-PPy particles may also be used to make dry pellets. Conducting NCC-PPy films were also prepared using the NCC-PPy colloid. The conductivity of the pellets and films were measured. Further studies of morphology and crystallinity of these PPy-coated MCC particles and NCC films were also carried out.

Example 2

Properties of Conductive Nanocomposite Films

FIGS. 2A-H show a glass slide 12 and a NCC-PPy coated glass slide 14. Free-standing films 16 can be made with good flexibility and mechanical strength. Given the small particle size and the stable colloid form, typical standard thin film process methods are applicable (such as dip coating, film casting, printing, and etc.). A transparent and very thin (<3 μm) NCC-PPy film on the glass slide can be obtained by cast coating of the glass slide and drying under the ambient condition. The thin flexible free-standing film possesses good optical transparency and can be bent without breakage.

The electrical resistance of the NCC-PPy transparent coating on the glass slide was measured by the four probe method. The transparent NCC-PPy coating of 2.3 μm thick on the glass slide had an average resistance of $1.74 \times 10^5$ Ohm/Square (Ω/□) which corresponded to a conductivity of $\sigma = 2.499 \times 10^{-2}$ S/cm. The NCC-PPy (2.3 μm thick) and NCC (0.7 μm thick) coated glass slides were scanned using a Perkin Elmer UV-spectrometer—Lambda 12 (Perkin Elmer, USA) in the visible light wavelength region from 400 to 700 nm. As shown in FIGS. 3A-B, the peak visible light transmittance of the NCC-PPy coated glass slide (2300 nm thick) was about 67% at 566 nm wavelength (green region) and the peak transmittance of the NCC coated glass slide was about 84% (though thinner, 700 nm thick).

In FIGS. 4A-C, surface morphology of the NCC-PPy coated film on a glass slide was obtained using an Atomic Force Microscope (AFM) (μTA 2990, TA Instruments, USA) with the contact mode and pyramidal silicon nitride tips. Root mean square ($R_{rms}$) values obtained from the topographic images of $10 \times 10$ μm², $5 \times 5$ μm² and $2 \times 2$ μm² scan areas were used to determine the roughness of the films. The average roughness of the NCC-PPy films were very low at $R_{rms} < 7$ nm.

Example 2

Conductivity of PPy-NCC Nanoparticles

For conductivity measurements, the oven dried MCC-PPy powders were pressed into cylindrical pellets of 1.2 cm of diameter in size using a standard FTIR pelletizer by applying a pressure of 5 Torr using a hydraulic press.

Electrical measurements were performed with a Femtostat 2 device (Gamry Instruments, USA). Two copper leads were placed on the surfaces of either pellet or film with a distance (L) of 0.5 cm between the electrodes. The electrodes were fixed by drops of a silver based conducting epoxy resin of 0.2 cm in width (W). The resistance of the pellets (R, ohm) was measured by applying 1V or 2V for 1800 seconds and monitoring the passing current under the room temperature using the two probe method. The resistance is proportional to the resistivity, $\rho$, ($\rho$=R×area/length), ohm*cm, from which the conductivity $\sigma$ ($\sigma=1/\rho$, S/cm) was calculated.

Conductivity measurement was additionally verified using a four probe method (Table 1). In this method, the resistance is given by:

$$R=\rho*(L/A)$$

where "$\rho$" (Rho) is the resistivity of the sample, and "L" and "A" are length and cross-sectional area of the sample, respectively. If "W" is the width of the sample and "t" is its thickness (i.e. A=W*t), then the resistance can be written as:

$$R=(\rho/t)(L/W)=R_s(L/W)$$

where $R_s=\rho/t$ is the sheet resistance. The unit for the sheet resistance is ohm (since L/W is dimensionless), which is the same as R. To avoid the confusion between R and $R_s$, the sheet resistance is specified in unit of "ohms per square" since the ratio of L/W can be considered as 1 corresponding to a unit square area (of any size) of the resistor material.

The electrical conductivity measurement results are summarized in Table 1. Comparing to MCC pellets, MCC-PPy pellets had an increase of 4 orders of magnitude in electrical conductivity, i.e. from $8.27\times10^{-11}$ to $3.95\times10^{-7}$ S/cm. On the other hand, the electrical conductivity of the NCC-PPy film was 7 orders of magnitude higher than the NCC film. Clearly, PPy played a dominant role in determining the conductivity of the films and pellets. Cellulose crystallinity may have also played a role in affecting the conductivity of the resulting film by affecting the substrate characteristics [17]. The conductivity of the NCC-PPy film (0.011 S/cm) approached the conductivity of the pure PPy pellets (0.15 S/cm) suggesting a full coverage of the cellulose by PPy.

According to Table 1, the electrical conductivity of the MCC pellets was ~$10^{-11}$ S/cm at the room temperature. The conductivity of the NCC films was two orders of magnitude higher than the MCC pellets, $10^{-8}$ versus $10^{-10}$ S/cm. This could be caused by the acid hydrolysis method. The residual sulphate groups on NCC may have added additional charges in the NCC films to give a higher electrical conductivity.

TABLE 1

Conductivity Values for MCC, PPy, and MCC-PPy Pellets and NCC and NCC-PPy Films

| Samples | @ 1 V (S/cm) | @ 2 V (S/cm) | Four probe (S/cm) |
|---|---|---|---|
| MCC pellet | 1.61E−10 | 8.27E−11 | 9.01E−11 |
| NCC film | 2.52E−9 | 3.95E−9 | 5.67E−9 |
| MCC-PPy pellet | 3.63E−7 | 3.83E−7 | 1.31E−7 |
| NCC-PPy film | 5.91E−3 | 1.11E−2 | 9.83E−3 |
| PPy pellet | 3.97E−1 | 1.50E−1 | 5.13E−1 |

Example 3

Scanning and Transmission Electron Microscopy Analysis of Particle Morphology

For scanning electron microscopy (SEM) analysis, dried MCC and MCC-PPy powders were spread on the aluminum specimen stubs (1 cm in diameter) containing double-sided carbon coated adhesive tapes. The morphology of the sputter coated samples was examined with a Hitachi S-2500 scanning electron microscope (Hitachi Inc. USA) using an acceleration voltage of 15 kV and at 15 mm working distance. The TEM analysis for NCC and NCC-PPy was performed using a Hitachi HD-2000 STEM (Scanning Transmission Electron Microscope) (Hitachi Inc., USA). The samples were consisted of drops of dilute NCC-PPy and NCC colloids on TEM grids.

Figure 6A:
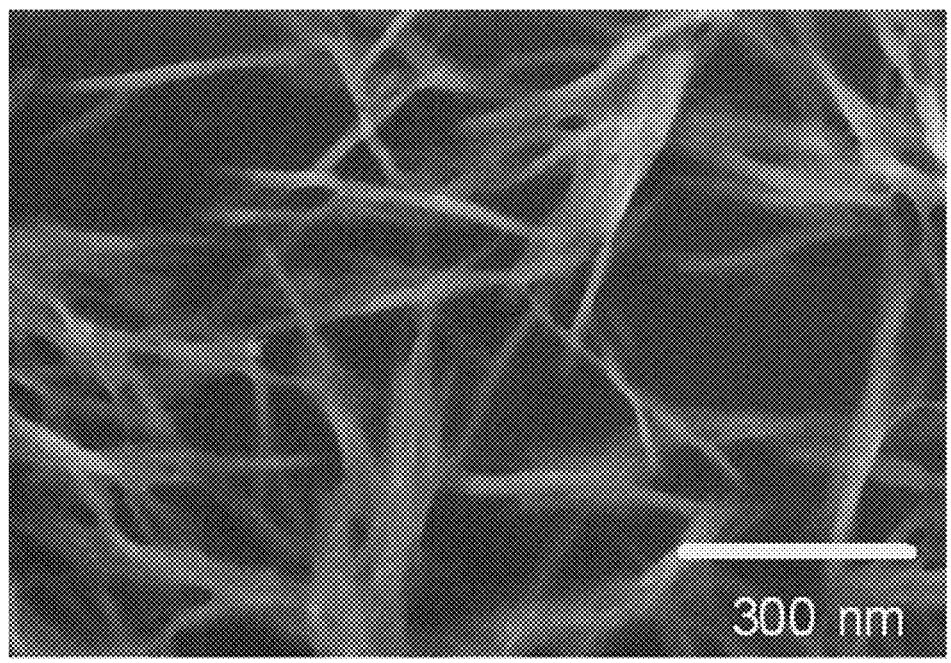
FIGS. 6A-B show transmission electron microscope (TEM) images of (a) NCC and (b) NCC-PPy.
Figure 6B:
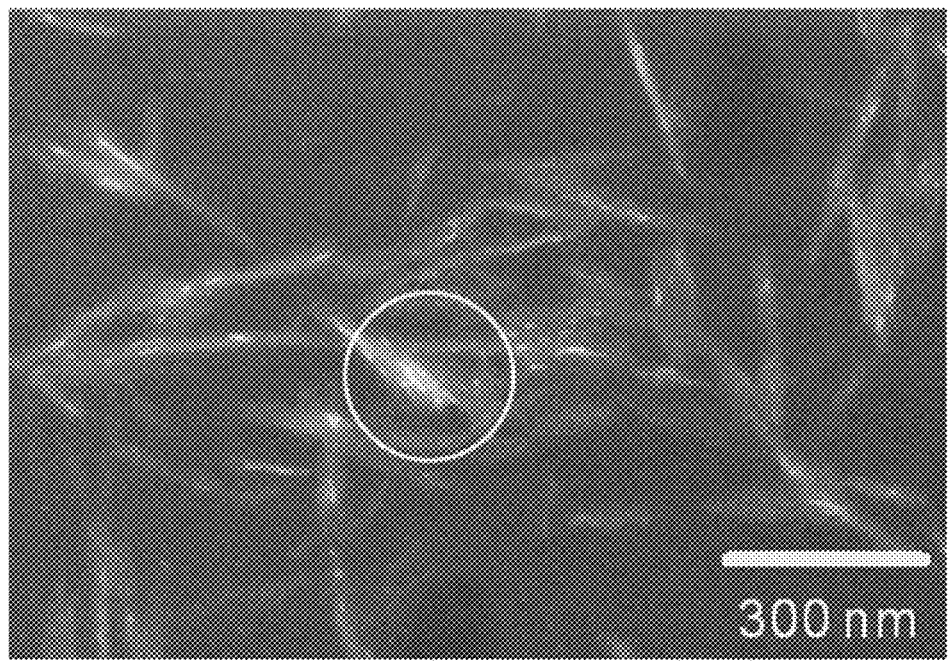

SEM images of MCC and MCC-PPy particles are shown in FIGS. 5A-D. In the higher magnified SEM image (2 μm×2 μm) of MCC-PPy, small granular shapes on the MCC surface were usually attributed to polypyrrole. Transmission Electron Microscopy (TEM) images of the NCC and NCC-PPy particles are shown in FIGS. 6A-B. The images clearly illustrated the needle shaped morphology of the NCC particles in both cases. Small areas of high contrast were seen on the surfaces of PPy treated NCC particles, which could be caused by the PPy.

Figure 7A:
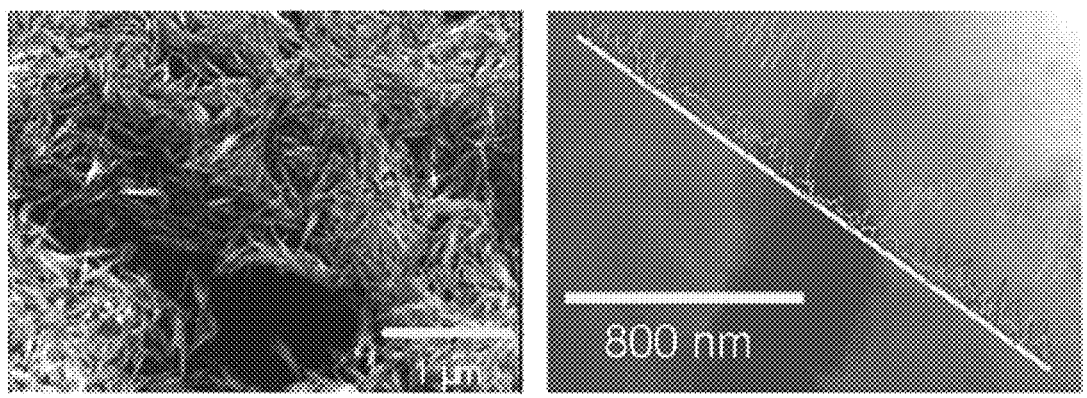
FIGS. 7A-B provide (a) TEM images of NCC-PPy at two different magnification levels and (b) energy-dispersive x-ray (EDX) analysis of O, N, C, and Cl.
Figure 7B:
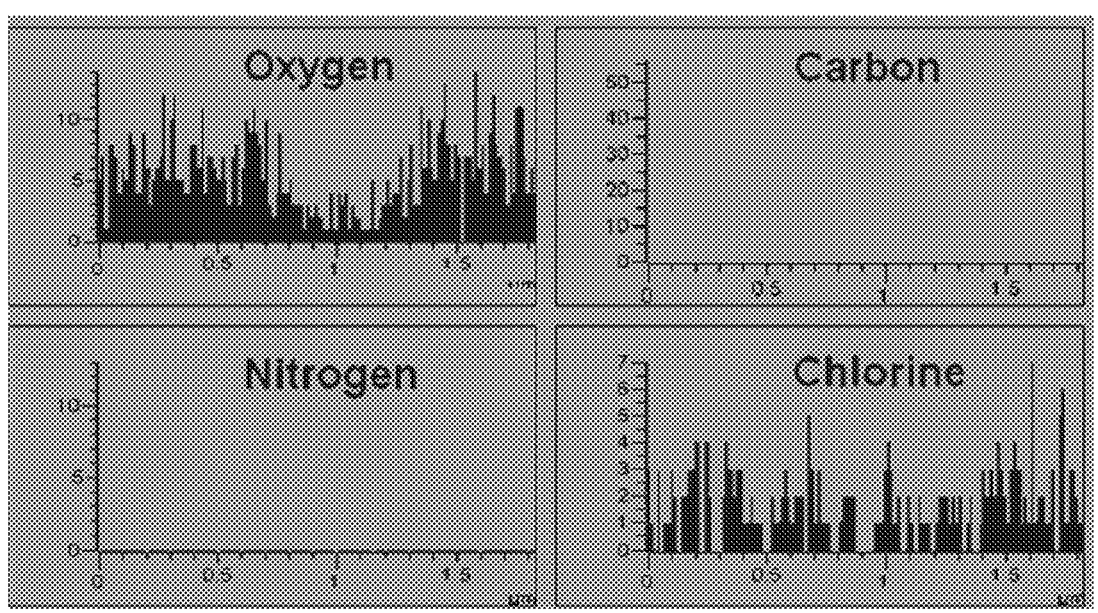

The TEM images of NCC-PPy showed that the NCC needles had an average diameter (D) of 40±10 nm, length (L) of 400±100 nm, and aspect ratio (L/D) of 10±2. Energy Dispersed X-ray (EDX) (FIGS. 7A-B) was used to verify the presence of polypyrrole via revealing the presence of significant nitrogen and chlorine contents (from polypyrrole).

Figure 8A:
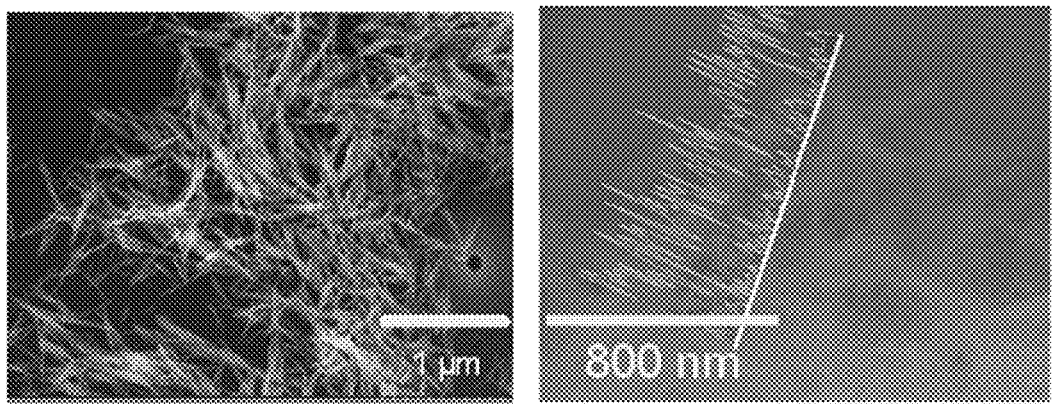
FIGS. 8A-B provide (a) TEM images of NCC at two different magnification levels and (b) EDX analysis of O, N, C, and Cl.
Figure 8B:
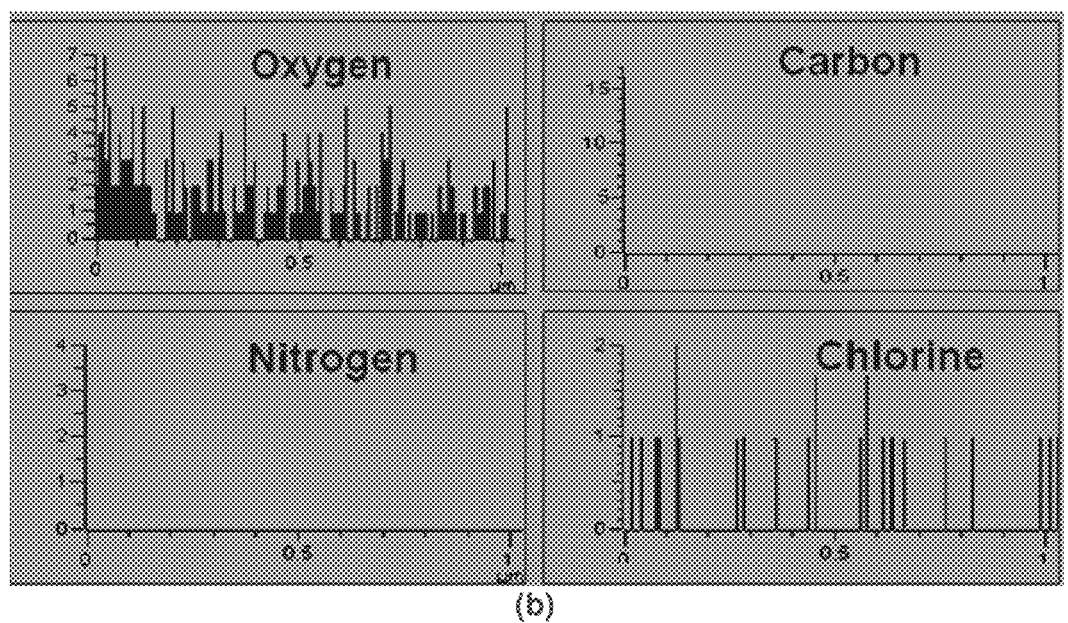

In contrast, EDX analysis of NCC (in FIGS. 8A-B) showed a negligible trace of these elements. Meanwhile, according to the elemental analysis (CHNS/O Analyser-2400, Perkin Elmer Inst., USA), C, H and N contents were found to be 33%, 5.71%, and 0.4%, respectively, for the NCC-PPy film and 42.08%, 6.21%, and 0% (i.e., no nitrogen)), respectively, for the NCC film. These results confirmed the presence of PPy in NCC-PPy particles and films.

Example 4

X-Ray Diffraction Crystallinity Analysis

Figure 9:
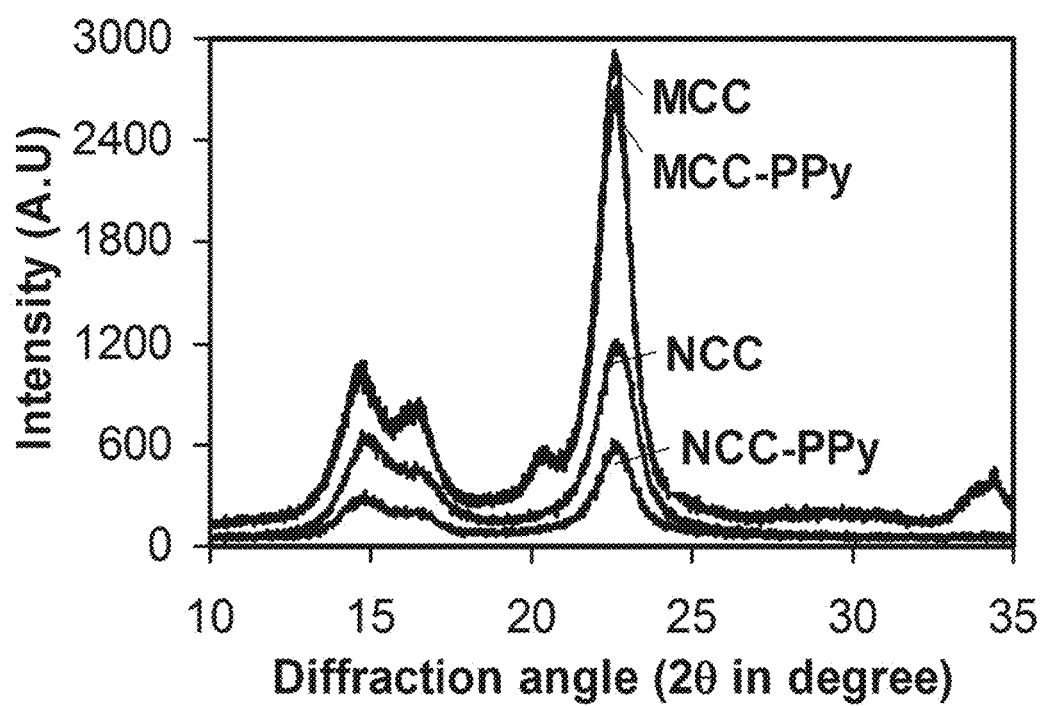
FIG. 9 shows x-ray diffraction measurements of microcrystalline cellulose (MCC) and MCC-PPy pellets and NCC and NCC-PPy films.

The X-ray Diffraction (XRD) measurements of MCC and MCC-PPy pellets and NCC-PPy and NCC films were performed on a Philips PW3040/00 X'Pert MPD system (Philips, Netherlands). The diffracted intensity of Cu Kα radiation ($\lambda$=0.1542 nm; 40 kV and 40 mA) was measured in a 2θ range between 10° and 50°. The XRD results are shown in FIG. 9 and Table 2. The diffraction peaks of the standard commercially purchased MCC exhibited a highly crystalline structure. It can be observed that the peak intensity for all cellulose materials was around 22°, corresponding to the crystalline cellulose. There was also a smaller peak near 18°, suggesting the existence of an amorphous region [18]. The XRD diffraction peaks of MCC and MCC-PPy pellets and NCC and NCC-PPy films were similar to each other, with NCC and NCC-PPy films showing some drop in the degree of crystallinity.

TABLE 2

XRD Results for MCC, PPy, and MCC-PPy Pellets and NCC and NCC-PPy Films

|  | peak @ 22° | peak @ 18° | C.I % |
|---|---|---|---|
| MCC | 2930 | 279 | 90.48 |
| MCC-PPy | 2713 | 273 | 89.94 |
| NCC | 1218 | 260 | 78.65 |
| NCC-PPy | 610 | 88 | 85.57 |

From the XRD data, the crystallinity index in % can be calculated by using:

Crystallinity Index=C.I=[$I_{(crys)}$−$I_{(amor)}$]*100/$I_{(crys)}$ where $I_{(crys)}$ the peak intensity at 22° and $I_{(amor)}$ is the peak intensity at 18°.

Based on FIG. 9, the crystallinity index (%) was calculated as 90.48, 89.94, 78.65, and 85.57 for MCC, MCC-PPy, NCC, and NCC-PPy, respectively (Table 2). Neng Wang et al [4] have reported previously that during nanocrystalline cellulose formation acid may disrupt crystalline region of the cellulose and reduce the degree of crystallinity. Thus, most likely the cellulose crystalline structure in NCC-PPy and NCC films was influenced by the treatment of polypyrrole and sulphuric acid. Interestingly, NCC-PPy had a higher crystallinity than NCC alone obtained following the same preparation procedure.

Example 5

Reduction-Oxidation Response

The reduction-oxidation response of the NCC-PPy films was studied using a Femtostat 2 instrument (Gamry Instruments, USA) and the cycle was scanned from −0.8 to +0.5 V using SCE (Saturated Calomel Electrode) as the reference electrode.

Figure 10A:
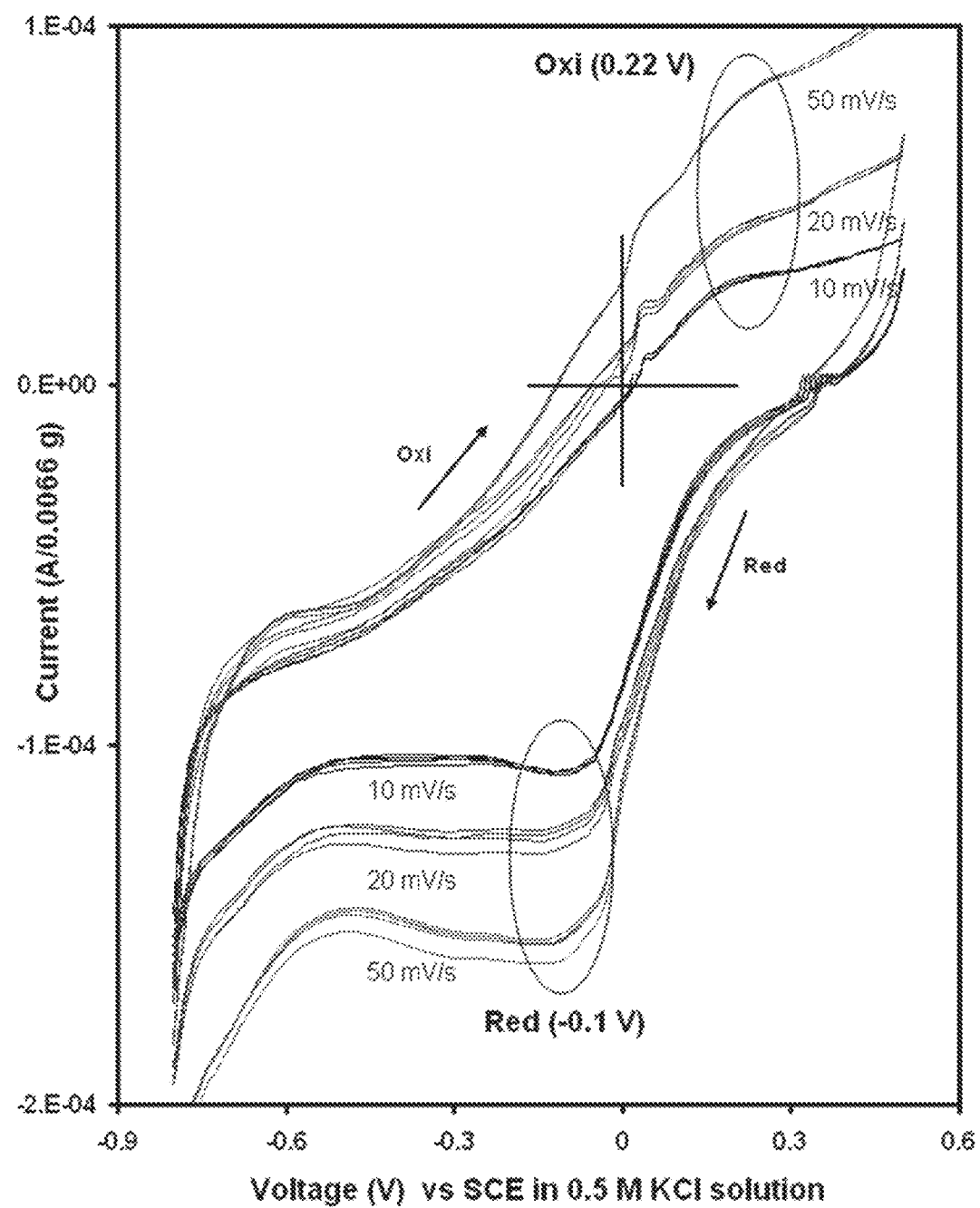
FIGS. 10A-B show cyclic voltammograms of the NCC-PPy composite on a Pt electrode in 0.5 M potassium chloride solution from −0.8 V to +0.5 V for scan rates from 10 mV s-1 to 50 mV s-1 (5 cycles each), where
Figure 10B:
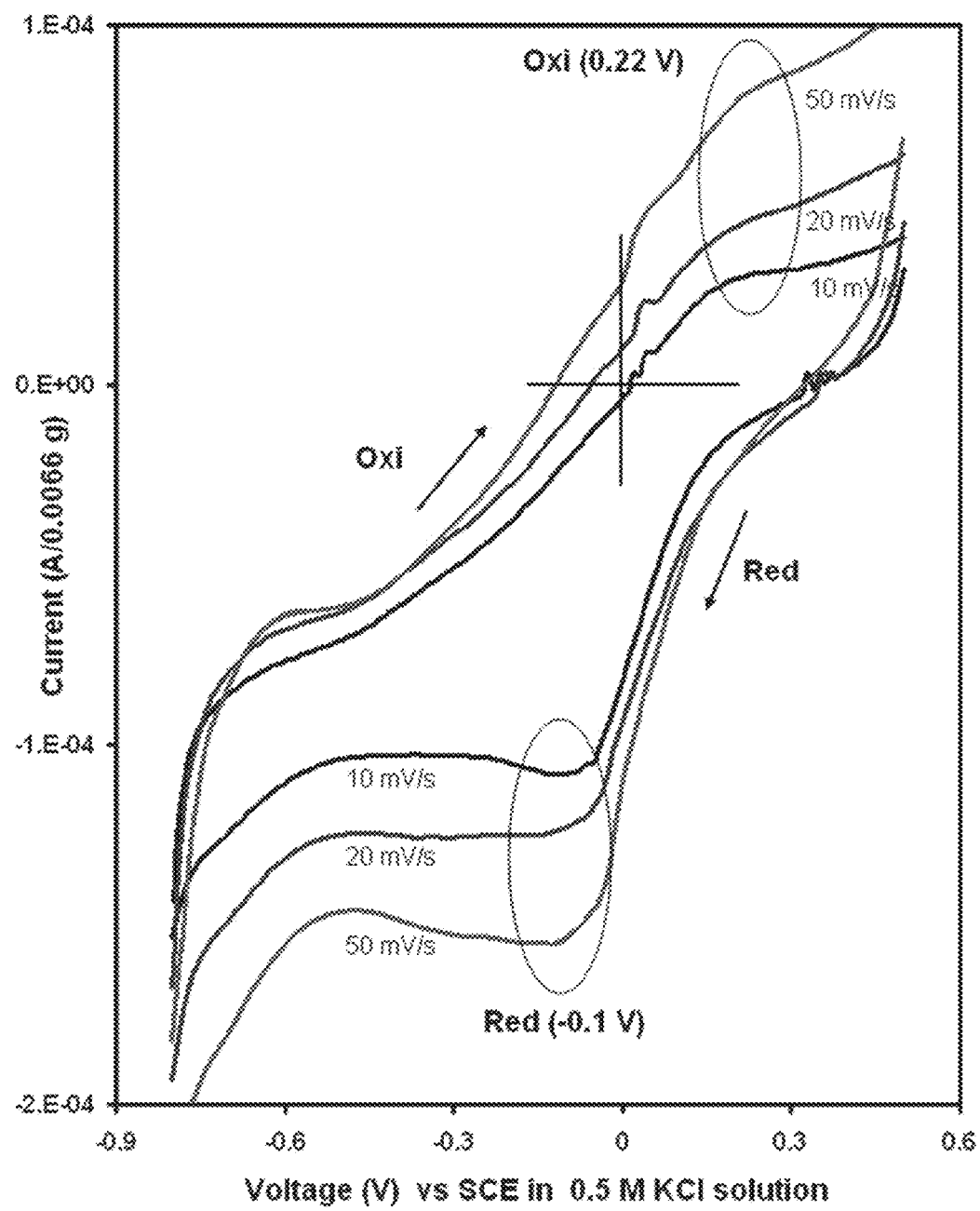

FIGS. 10A-B shows the cyclic voltammograms recorded at different scan rates for NCC-PPy composite films on platinum electrodes in 0.5 M potassium chloride solution. In this test, NCC-PPy coated platinum electrode was used as the working electrode and pure platinum was used as the counter electrode. SCE (Saturated Calomel Electrode) was used as the reference electrode. The working electrode was scanned from −0.8 V to +0.5 V vs. SCE at different scan rates of 10 mV/s, 20 mV/s and 50 mV/s. The current shown in FIGS. 10A-B was normalized by the total mass of the conductive NCC-PPy film used on the working electrode. It can be seen that the amount of passing charge during the reduction-oxidation process decreased as the scan rate increased. Significant differences were observed in the cyclic voltammograms with respect to the position of oxidation/reduction peaks, which is due to the larger iR drop at higher scan rates. The oxidation and reduction peaks were shown to be at 0.22 V and −0.1 V (vs. SCE), respectively. These results demonstrated the high electroactivity of the NCC-PPy films and showed clear potential for these composite materials to be applied as electrode materials in solid state batteries [10].

Example 6

Thermal Stability

Figure 11:
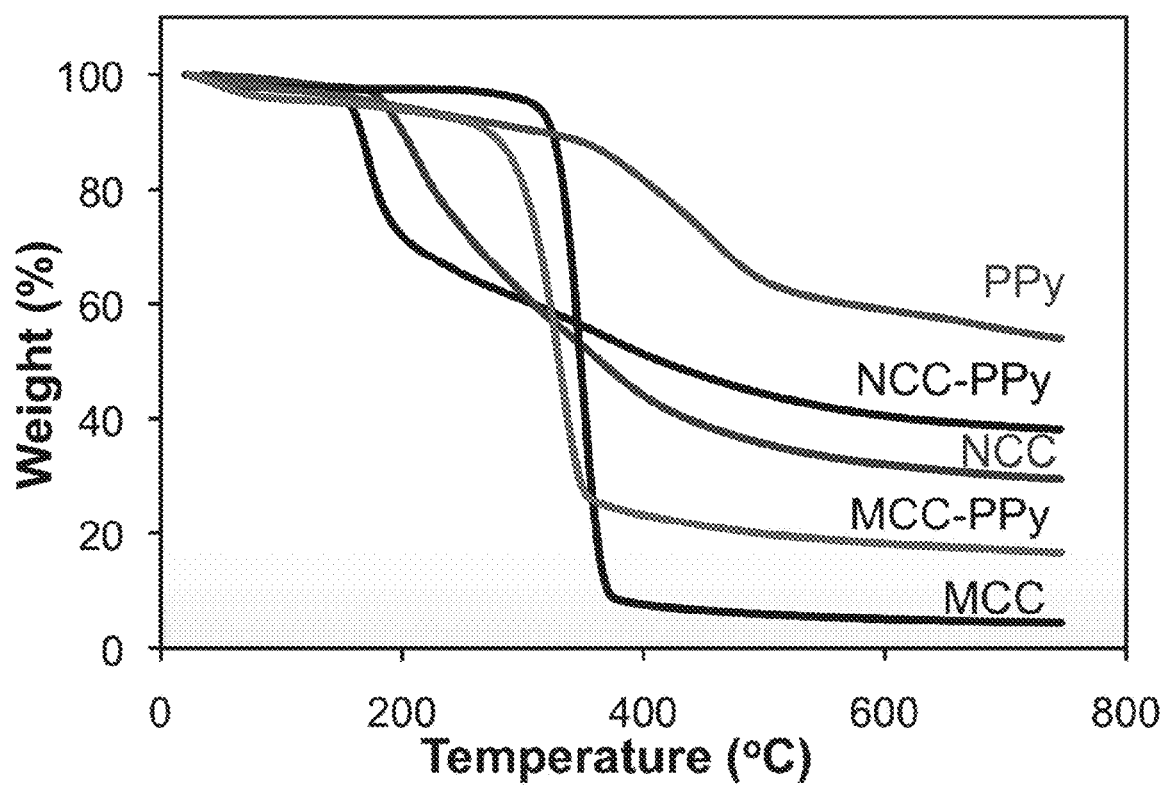
FIG. 11 provides a thermogravimetric analysis measurement of MCC, MCC-PPy and PPy powders and NCC and NCC-PPy films.

The thermal degradation curves of MCC and MCC-PPy pellets and NCC and NCC-PPy films were measured using a Thermogravimetric Analyzer (TA Instruments, USA) and are given in FIG. 11. The MCC pellets had the highest onset degradation temperature at 400° C. But they had the lowest weight retention at higher temperatures (about 5% at >500° C.). MCC-PPy pellets had a slightly lower onset degradation temperature (300° C.) as well as a slightly higher residue content (15%). The NCC and NCC-PPy films had a much lower onset degradation temperatures (around 200° C.). And NCC (>30%) and NCC-PPy (>40%) had much higher residue contents than the MCC and MCC-PPy pellets.

In contrast, PPy pellets showed different thermal degradation behaviour. The PPy pellets showed a gradual decay at rather low temperatures to around 400° C. and had more than 60% weight retention for temperatures above 500° C. The onset thermal degradation temperature of these materials is affected by three factors: 1) cellulose degradation; 2) deprotonation of PPy, i.e. elimination of the dopant; 3) elimination of the sulphuric group [10, 19]. That could have been the reason for these observations.

Example 7

Solubility and Stability

NCC-PPy films were used to study the solubility/stability of the film in different pH buffer solutions (pH from 1 to 11), solvents (ethanol, methanol, chloroform, acetone, and water), concentrate acids (HCl, $H_2SO_4$, $HNO_3$), weak acid ($H_2O_2$), and base (NaOH) solutions. There was no sign of color change and film disintegration in pH solutions from 1 to 11 even after 2 months. And the films were insoluble in water and solvents such as ethanol, methanol, chloroform, and acetone. The stability of the film submerged in acids and base solutions varied according to the following descending order: HCl (solution showed slow light orange color change, film stayed intact) >$HNO_3$ (solution showed faster light orange color change, film had less integrity) >$H_2SO_4$ (the solution turned to dark black color with the film disintegrated). The films in $H_2O_2$ stayed intact but the black color of the film disappeared. The films in NaOH showed a gradual change in solution (similar to HCl) but remained still intact.

Example 8

NCC-PPy Materials Made from Different Forms of Cellulose

In this example, a number of different types of cellulose are demonstrated as being suitable for forming NCC-PPy colloids. As described above, the starting material for NCC-PPy formation is cellulose, which may have one or more dimensions on a micron scale.

NCC-PPy colloids were produced using four different types of cellulose including kraft pulp fibers, cellulosic fibers from bark, a microcrystalline cellulose powder, and a cellulose powder having micron particle sizes. FIGS. 12A-D show transmission electron microscopy images of NCC-PPy colloid particles made with these four different types of cellulose. As shown in FIGS. 10A-B, the processing, according to methods disclosed above, of these different forms of cellulose, all produced nanocrystalline cellulose-PPy colloid nano-fibers having diameters in the range of 20-30 nm and typical lengths within the range of 300-400 nm.

Example 9

Preparation of NCC-PPy Colloids Using Different Acids

In the present example, methods described above were performed using HCl instead of $H_2SO_4$. The preparation steps employed to produce NCC-PPy via reaction with HCl were similar to those described above for $H_2SO_4$, with three differences:

(1) 4 N HCl is used instead of 64% $H_2SO_4$;

(2) acid hydrolysis is carried out at 80° C. instead of 45° C.; and (3) acid hydrolysis reaction time was increased from 45 minutes to 4 hours.

These differences illustrate that different choices in the reactants employed for forming NCC-PPy colloids or films will result in different process parameters, and it is understood that these different process parameters may be determined by those skilled in the art.

Figure 13:
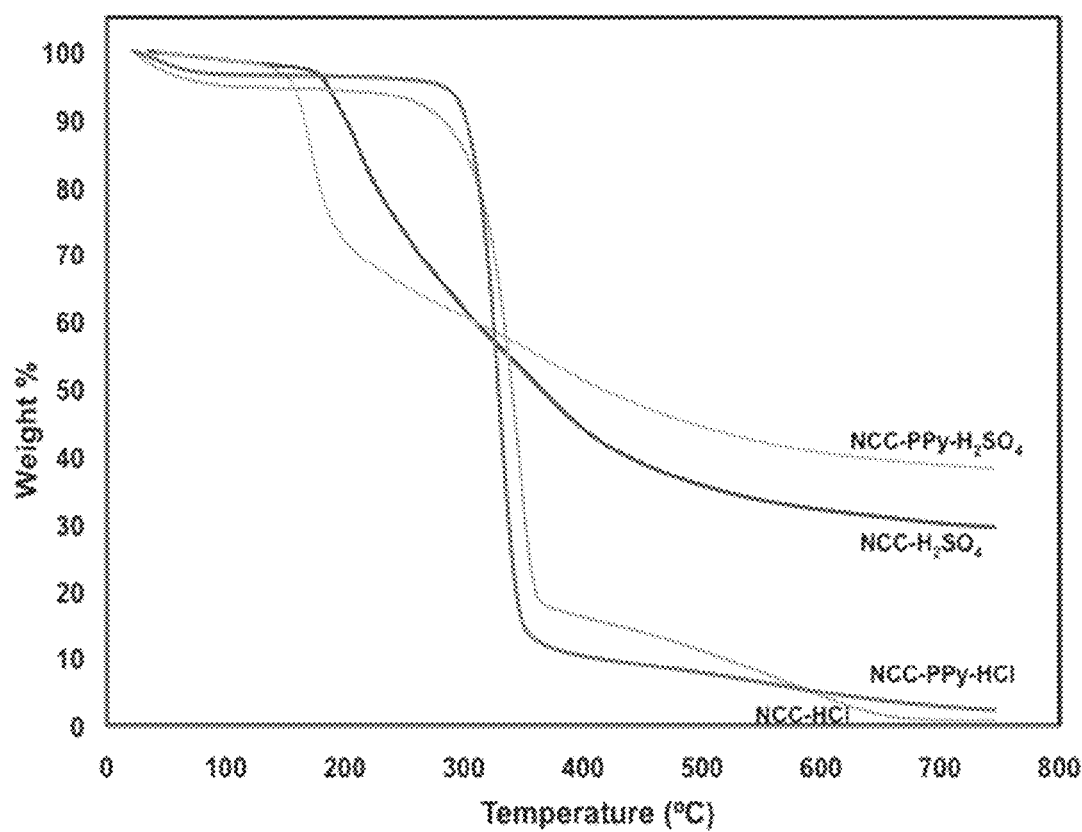
FIG. 13 shows thermogravimetric measurements of NCC-PPy and NCC particles formed using both $H_2SO_4$ and HCl.

Despite these different acids and process parameters, similar particle morphologies were obtained in the colloids obtained using $H_2SO_4$ and HCl. Notably, however, the thermal stability of HCl prepared NCC-PPy particles was markedly different from that obtained using $H_2SO_4$, as shown in FIG. 13.

Example 10

Application of NCC-PPy Coatings to Biosensors

In the present example, the application of NCC-PPy as a material suitable for biosensors is demonstrated. Although NCC-PPy may be employed in a wide range of biosensor applications, platforms and configurations, the present non-limiting example demonstrates the application of NCC-PPy to a class of biosensors in which the analyte is glucose.

Figure 14A:
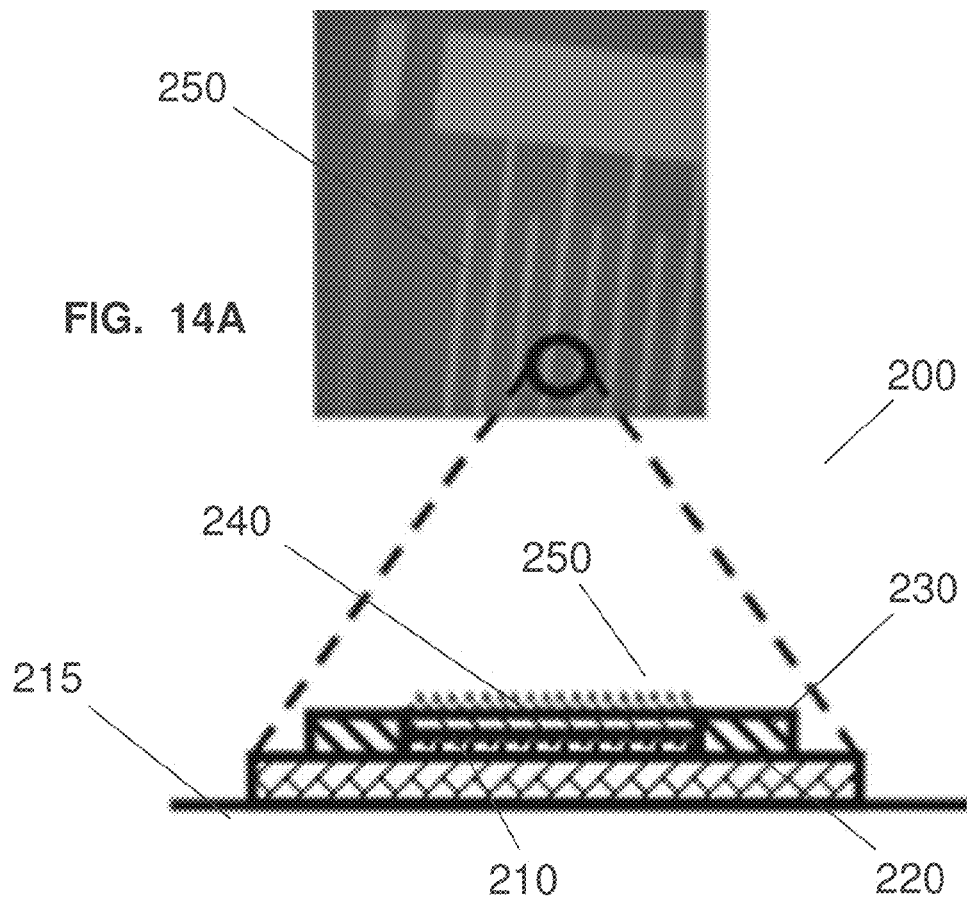
FIGS. 14A-B provide (a) a schematic of a NCC-PPy based glucose sensor and (b) an illustration of an example electrochemical detection process.

FIG. 14(a) shows the biosensor platform employed in the present example implementation. The biosensor 200 includes a layer of NCC-PPy film 210 (15 ug/cm$^2$) provided between electrodes 230, which may be made from a conductor such as gold. Layer 210 is deposited on a $SiO_2$ insulating layer 220, and insulating layer 220 is supported on a silicon substrate 215. The biosensor is functionalized by immobilizing 50 U/ml of HRP/GOx enzyme 240 on the NCC-PPy layer 210 by deposition. In another example, GOx enzyme without HRP could be employed. In the example embodiment shown in the figure, electrodes 230 are formed as an interdigitated array electrode 250 for improved electrical current detection due to increased collection surfaces. It will be apparent to those skilled in the art that other electrode geometries may be alternatively employed.

Figure 14B:
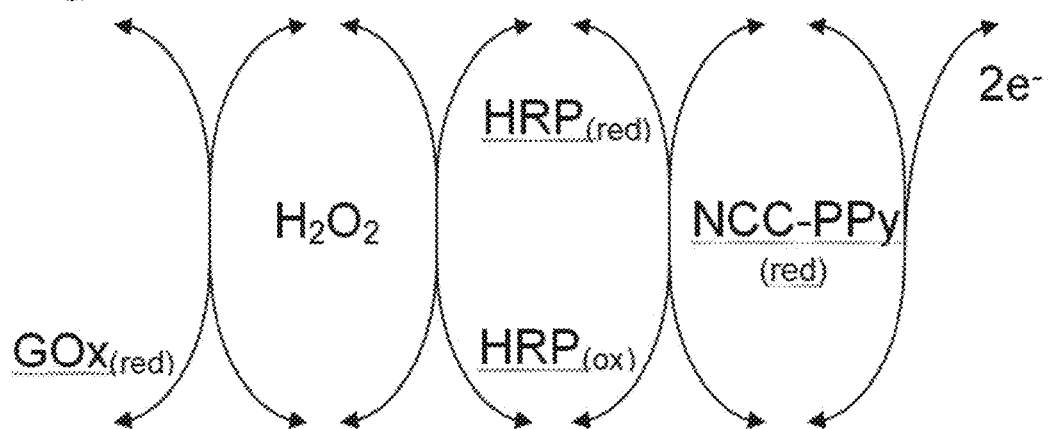

FIG. 14(b) illustrates the process of electrochemical detection according to the example implementation shown in FIG. 14(a). When the analyte 250 (glucose solution) is present, GOx/HRP enzyme 240 gains electrons due to the redox reactions and then transfers the electrons to NCC-PPy layer 210 to be collected by the electrodes 230 to result in an electrical current.

Figure 15:
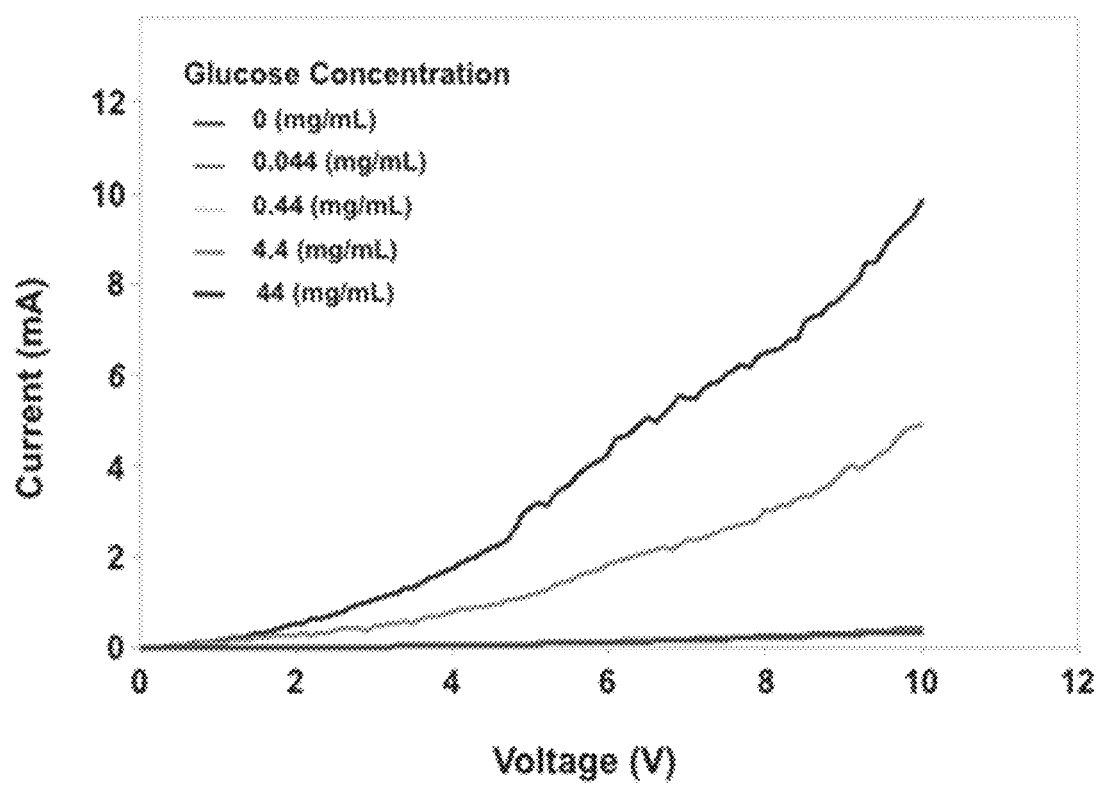
FIG. 15 plots the electrochemical response of a glucose detector element in which conductivity changes in response to changes in glucose concentration are sensed by a glucose oxidase enzymes immobilized on an NCC-PPy coating film.

The ability of this biosensor to detect a wide range of glucose concentrations is shown in FIG. 15. With physical immobilization of glucose oxidase enzyme, the biosensor containing NCC-PPy coating film exhibited similar redox behaviour as PPy upon exposure to glucose solutions, as illustrated by the conductivity change (I-V characteristics) in response to varying glucose concentrations.

Example 11

Application of NCC-PPy Coatings to ESD

The present example provides a demonstration of the use of coatings made from NCC-PPy colloids for electrostatic discharge (ESD) applications. A number of NCC coatings were formed, and the volume resistance was measured as per ANSI/ESD STM 11.12-2007, which provides a standard test method for "Volume Resistance Measurements of Static Dissipative Planar Materials". The ANSI/ESD STM 11.12-2007 is a standard test method for the protection materials of electrostatic discharge susceptible items developed by the ESD Association. It specifies sample preparation, testing procedure and environment, instrumentation, and data reporting protocols.

Table 3 below lists volume resistance measurements of selected NCC coatings (~3 micron thick) formed on flexible clear Mylar film (4"×6" in area) measured per ANSI/ESD STM 11.12-2007. The volume resistance spans a wide range of values, depending on the nature of the cellulose and the presence of PPy. The volume resistance is tunable within the range as shown in Table 1.

According to ESD Association, for ESD applications conductive materials shall have surface resistivity <10$^5$ Ohm/sq or volume resistivity <10$^4$ ohm-cm. ESD dissipative materials shall have surface resistivity larger or equal to 1E5 Ohm/sq but less than 1E12 Ohm/sq or volume resistivity greater or equal to 1E4 Ohm-cm but less than 1E11 Ohm-cm. Electrostatic shielding materials shall have surface resistivity >1E12 Ohm/sq or volume resistivity >1E11 Ohm-cm. Insulating materials have surface resistivity >1E12 Ohm/sq or volume resistivity >1E11 Ohm-cm.

TABLE 3

Volume Resistance and Volume Resistivity of PPy-NCC Coated Materials for ESD Applications

| Coatings on Mylar Film (Starting Material) | Thickness (cm) | Volume Resistance (Ohm) @ 10 V | Volume Resistance (Ohm) @ 100 V | Volume Resistivity @ 10 V (Ohm-cm) |
|---|---|---|---|---|
| NCC coating (cellulose powder) | 0.001 | 3.38E+07 | 3.84E+07 | 2.40E+11 |
| NCC-PPy coating (cellulose powder) | 0.001 | 2.48E+04 | — | 1.76E+08 |
| NCC-PPy coating (Avicel) | 0.001 | 1.94E+06 | 3.70E+05 | 1.38E+10 |
| NCC-PPy coating (Kraft pulp fiber) | 0.0005 | 3.21E+04 | — | 4.56E+08 |
| NCC-PPy coating (Bark cellulose fiber) | 0.0012 | 2.49E+03 | — | 1.47E+07 |
| Mylar Film (base) | 0.017 | 2.99E+11 | 1.71E+12 | 1.25E+14 |

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

CITED REFERENCES

[1] X. M. Dong, J. F. Revol, D. G. Gray, Cellulose 1998, 5, 19,
[2] S. Beck-Candanedo, M. Roman, D. G. Gray, Biomacromolecules 2005, 6, 1048.
[3] E. D. Cranston, D. G. Gray, Biomacromolecules 2006, 7, 2522.
[4] N. Wang, E. Ding, R. Cheng, Langmuir 2008, 24, 5.
[5] R. J. Waltman and J. Bargon, Can. J. Chem. 1986, 64, 76.
[6] A. G. MacDiarmid, Synth. Met. 2002, 125, 11.
[7] A. Shimizu, K. Yamataka and M. Kohno, Bull. Chem. Soc. Jpn. 1988, 61, 4401.
[8] T. Osaka, T. Momma, H. Ito, and B. Scrosati, J. Power Sources 1997, 68, 392.

[9] S. R. Sivakkumar and D. Kim, J. Electrochem. Soc. 2007, 154, A134.

[10] G. Nystrom, A. Razaq, M. Stroomme, L. Nyholm, and A. Mihranyan, Nano Letters 2009, 9, 3635.

[11] R. B. Bjorklund and Bo Liedberg, J. Chem. Soc. Chem. Commun. 1986, 1293.

[12] L. Flandin, G. Bidan, Y. Brechet, and J. Y. Cvaille, Polymer Composite 2000, 21, 165.

[13] J. H. Johnston, F. M. Kelly, J. Moraes, T. Borrmann, and D. Flynn, Curr. Appl. Phys. 2006, 6, 587.

[14] F. M. Kelly, J. H. Johnston, T. Borrmann and M. J. Richardson, Eur. J. Inorg. Chem. 2007, 35, 5571.

[15] K. Li, X. Tan and D. Yan, Surf. Interface Anal. 2006, 38, 1328.

[16] G. Nystrom, A. Mihranyan, A. Razaq, T. Lindstrom, L. Nyholm and M. Strømme, J. Phys. Chem. B 2010, 114, 4178.

[17] K. Sakamaki, K. Akagi, H. Shirakawa, H. Kyotani, Synth. Met. 1997, 84, 365.

[18] L. Y. Mwaikambo, M. P. Ansell, J. Appl. Polym. Sci. 2002, 84, 2222.

[19] J. I. Moran, V. A. Alvarez, V. P. Cyras, A. Vazquez, Cellulose 2008, 15, 149.

The invention claimed is:

1. A method of preparing an electrically conducting nanocomposite material, the method comprising the steps of:
providing cellulose microparticles coated with a conductive polymer;
adding the microparticles to an acid solution for initiating an acid hydrolysis reaction;
reacting the microparticles with the acid to form nanoparticles comprising the conductive polymer and the cellulose;
quenching the acid hydrolysis reaction; and
separating the nanoparticles from the acid solution to obtain a colloidal solution of the nanoparticles.

2. The method according to claim 1 further comprising:
pouring the colloidal solution onto a solid surface; and
drying the colloidal solution to obtain a nanocomposite layer.

3. The method according to claim 2 further comprising removing the nanocomposite layer, so that the nanocomposite layer is free-standing.

4. The method according to claim 2 wherein the nanocomposite layer has a thickness suitable for optical transmission.

5. The method according to claim 2 wherein the nanocomposite layer has a thickness on a micron scale.

6. The method according to claim 2 wherein the nanocomposite layer has a thickness on a submicron scale.

7. The method according to claim 1 wherein the conductive polymer is polypyrrole.

8. The method according to claim 1 wherein the conductive polymer is selected from the group consisting of polyaniline, polyindole, polythiophene, poly(3-methylthiophene), poly(N-methyl aniline), and poly(o-toluidine).

9. The method according to claim 1 wherein the step of reacting the microparticles with the acid is performed for a time duration such that an average diameter of the nanoparticles is between about 30 and 50 nanometers, and an average length of the nanoparticles is between about 300 and 500 nanometers.

10. The method according to claim 1 wherein the microparticles comprise microcrystalline cellulose.

11. The method according to claim 1 wherein the step of providing the microparticles comprising cellulose coated with a conductive polymer is performed by:
forming a mixture comprising cellulose microparticles, a monomer and a surfactant;
agitating the mixture to disperse the microparticles and to obtain cellulose microparticles coated with the monomer;
initiating a polymerization reaction to obtain cellulose microparticles coated with a conductive polymer; and
allowing the polymerization reaction to proceed for a prescribed time interval.

12. The method according to claim 11 wherein the step of initiating the polymerization reaction comprises adding an oxidant to the mixture, thereby initiating a polymerization reaction to form cellulose microparticles coated with the conductive polymer.

13. The method according to claim 12 wherein the oxidant is selected from the group consisting of iron (III) chloride hexahydrate, ferric chloride, ammonium persulphate, potassium persulphate, and phosphomolybdic acid hydrate.

14. The method according to claim 11 wherein the microparticles have a mean diameter between about 20 micrometers and about 25 micrometers and a length between about 40 and 60 micrometers.

15. The method according to claim 11 wherein the microparticles comprise fibers having a mean diameter on a micron scale and a length ranging from a micron scale to centimetre scale.

16. The method according to claim 11 wherein the microparticles comprise fibers comprising crystalline structures and amorphous structures.

17. The method according to claim 11 wherein prior to the step of initiating the polymerization reaction, the following steps are performed:
separating the cellulose microparticles coated with the monomer from the mixture; and
rinsing the cellulose microparticles coated with the monomer in a solution of the monomer.

18. The method according to claim 11 wherein said surfactant is selected from the group consisting of: sulfonic naphthalene acid, anthrquinone-2-sulfonic acid, tween-80, naphtalene sulfonic acid, p-dodecylbenzenesulfonic acid, cetyl trimethylammonium bromide, sodium dodecyl sulphate, cetyltrimethylammonium bromide and tritonX-100, alkyl sulfonates, and alkyl aryl sulfonate.

19. The method according to claim 1 wherein the cellulose microparticles coated with the conductive polymer are washed prior to the step of adding the microparticles to the acid solution.

20. The method according to claim 1 wherein the microparticles are washed in a dopant solution comprising a dopant prior to the step of adding the microparticles to an acid solution.

21. The method according to claim 20 wherein the dopant is one of chloride and sulphate.

22. The method according to claim 20 wherein the dopant is chloride and the dopant solution is hydrochloric acid.

* * * * *